United States Patent
Boroushaki et al.

(10) Patent No.: US 12,403,590 B2
(45) Date of Patent: Sep. 2, 2025

(54) ROBOTIC GRASPING VIA RF-VISUAL SENSING AND LEARNING

(71) Applicant: Massachusetts Institute of Technology, Cambridge, MA (US)

(72) Inventors: Tara Boroushaki, Cambridge, MA (US); Isaac S. Perper, Cambridge, MA (US); Fadel Adib, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 199 days.

(21) Appl. No.: 17/819,685

(22) Filed: Aug. 15, 2022

(65) Prior Publication Data

US 2023/0056652 A1 Feb. 23, 2023

Related U.S. Application Data

(60) Provisional application No. 63/232,698, filed on Aug. 13, 2021.

(51) Int. Cl.
*B25J 9/16* (2006.01)
*B25J 13/00* (2006.01)
(Continued)

(52) U.S. Cl.
CPC ........... *B25J 9/1612* (2013.01); *B25J 13/006* (2013.01); *B25J 19/023* (2013.01); *H01Q 1/2208* (2013.01)

(58) Field of Classification Search
CPC ...... B25J 9/1612; B25J 13/006; B25J 19/023; H01Q 1/2208
See application file for complete search history.

(56) References Cited

U.S. PATENT DOCUMENTS

| 11,420,652 B2 | 8/2022 | Connell et al. |
| 2018/0107969 A1* | 4/2018 | Trivelpiece ............ B25J 9/1679 |

(Continued)

FOREIGN PATENT DOCUMENTS

| CA | 3 131 314 | 10/2020 |
| JP | 6807949 B2 | 1/2021 |

OTHER PUBLICATIONS

"Alien"; Downloaded Mar. 30, 2022; https://alientechnology.com; 2 Pages.
(Continued)

*Primary Examiner* — Thomas E Worden
*Assistant Examiner* — Christopher A Buksa
(74) *Attorney, Agent, or Firm* — Daly, Crowley, Mofford & Durkee, LLP

(57) ABSTRACT

Described is the design, implementation, and evaluation of a robotic system configured to search for and retrieve RFID-tagged items in line-of-sight, non-line-of-sight, and fully-occluded settings. The robotic system comprises a robotic arm having a camera and antenna strapped around a portion thereof (e.g. a gripper) and a controller configured to receive information from the camera and (radio frequency) RF information via the antenna and configured to use the information provided thereto to implement a method that geometrically fuses at least RF and visual information. This technique reduces uncertainty about the location of a target object even when the object is fully occluded. Also described is a reinforcement-learning network that uses fused RF-visual information to efficiently localize, maneuver toward, and grasp a target object. The systems and techniques described herein find use in many applications including robotic retrieval tasks in complex environments such as warehouses, manufacturing plants, and smart homes.

16 Claims, 13 Drawing Sheets

(51) Int. Cl.
   B25J 19/02    (2006.01)
   H01Q 1/22    (2006.01)

(56) References Cited

U.S. PATENT DOCUMENTS

| | | | | |
|---|---|---|---|---|
| 2020/0242315 | A1* | 7/2020 | George | G06K 7/10475 |
| 2020/0310442 | A1* | 10/2020 | Halder | G05D 1/0221 |
| 2021/0232154 | A1* | 7/2021 | Kewitsch | B25J 11/005 |

OTHER PUBLICATIONS

"Coppelia"; Downloaded Mar. 30, 2022; http://www.coppeliarobotics.com; 3 Pages.
"Embotech"; Downloaded Mar. 30, 2022; https://www.embotech.com; 9 Pages.
"Gazebo"; Downloaded Mar. 30, 2022; http://gazeboism.org; 7 Pages.
"Point Cloud Library (PCL)"; Downloaded Mar. 30, 2022; http://pointclouds.org; 3 Pages.
"Rviz"; Downloaded Mar. 30, 2022; http://wiki.ros.org/rviz; 4 Pages.
Adib et al.; "Capturing the Human Figure Through a Wall"; ACM Transactions on Graphics, vol. 34, No. 6, Article 219; Published Nov. 2015; 13 Pages.
Ashok; "Demo: BiFocus—Using Radio-Optical Beacons for an Augmented Reality Search Application"; Proceeding of the 11th Annual International Conference on Mobile Systems, Applications, and Services; Jun. 25, 2013; 1 Page.
Aydemir et al.; "Search in the real world: Active visual object search based on spatial relations"; 2011 IEEE International Conference on Robotics and Automation; IEEE, 2011; 7 Pages.
Bajcsy et al.; "Active Perception"; Proceedings of the IEEE; vol. 76, No. 8; IEEE, 1988; 34 Pages.
Bohg et al.; "Interactive Perception: Leveraging Action in Perception and Perception in Action"; IEEE Transaction on Robotics; vol. 33, No. 6; IEEE Xplore Digital Library; DOI 10.1109/TRO.2017.2721939; IEEE, 2017; 18 Pages.
Boroushaki et al.; "Robotic Grasping of Fully-Occluded Objects using RF Perception"; 2021 IEEE International Conference on Robotics and Automation (ICRA); IEEE; May 30, 2021; 7 Pages.
Chen et al.; "Towards robotic picking of targets with background distractors using deep reinforcement learning"; Proceedings of the 2nd WRC Symposium on Advanced Robotics and Automation (WRC SARA); IEEE, Aug. 2019; 6 Pages.
Cui et al.; "Probabilistic Active Filtering with Gaussian Processes for Occluded Object Search in Clutter"; Applied Intelligence; vol. 50, No. 12; 2020; 25 Pages.
Danielczuk et al.; "Mechanical Search: Multi-Step Retrieval of a Target Object Occluded by Clutter"; 2019 International Conference on Robotics and Automation (ICRA); IEEE; May 20, 2019; 8 pages.
Danielczuk et al.; "X-Ray: Mechanical Search for an Occluded Object by Minimizing Support of Learned Occupancy Distributions"; 2020 IEEE/RSJ International Conference on Intelligent Robots and Systems (IROS); IEEE, 2020; 8 Pages.
Das et al.; "RFID Forecasts, Players and Opportunities: 2009-2019"; IDTechEx Report; Securing Pharma; Published in Apr. 2009; 17 Pages.
Dastin; "Exclusive: Amazon Rolls Out Machines that Pack Orders and Replace Jobs"; Reuters, Thomson Reuters 13; May 2019; 4 Pages.
Deyle et al.; "A Foveated passive UFH RFID system for mobile manipulation"; 2008 IEEE/RSJ International Conference on Intelligent Robots an Systems: IEEE; Sep. 22, 2008; 6 Pages.
Deyle et al.; "In-Hand Radio Frequency identification (RFID) for Robotic Manipulation"; 2013 IEEE International Conference on Robotics and Automation; IEEE; May 6, 2013; 8 Pages.
Deyle et al.; "RF Vision: RFID Receive Signal Strength Indicator (RSSI) Images for Sensor Fusion and Mobile Manipulation"; 2009 IEEE/RSJ International Conference on Intelligent Robots and Systems; IEEE, 2009; 8 Pages.
Dogar et al.; "Physics-Based Grasp Planning Through Clutter"; 2012; 8 Pages.
Du et al.; "Vision-based Robotic Grasping From Object Localization, Object Pose Estimation to Grasp Estimation for Parallel Grippers: A Review"; Artificial Intelligence Review 54.3 (2021); Mar. 2021; 39 Pages.
Gareis et al.; "A MIMO UHF-RFID SAR 3D Locating System for Autonomous Inventory Robots"; 2020 IEEE MTT-S International Conference on Microwaves for Intelligent Mobility (ICMIM); IEEE, 2020; 4 Pages.
Goller et al,; "Fusing RFID and Computer Vision for Probabilistic Tag Localization"; 2014 IEEE International Conference on RFID (IEEE RFID); Apr. 8, 2014; 8 Pages.
Gueaieb et al.; "An Intelligent Mobile Robot Navigation Technique Using RFID Technology"; IEEE Transactions on Instrumentation and Measurement; vol. 57, No. 9; DOI: 10.1109/TIM.2008.919902; Sep. 2008; 11 Pages.
Huang et al.; "Occlusion-Aware Reconstruction and Manipulation of 3D Articulated Objects"; 2012 IEEE International Conference on Robotics and Automation; IEEE, 2012; 7 Pages.
Inagaki; "Packing T-Shirts? There's a Uniqlo Robot for that"; The Financial Times Limited; 2022; 4 Pages.
Jang et al.; "End-to-End Learning of Semantic Grasping"; arXiv preprint arXiv:1707.01932; 2017; 14 Pages.
Kahn et al.; "Active Exploration Using Trajectory Optimization for Robotic Grasping in the Presence of Occlusions"; 2015 IEEE International Conference on Robotics and Automation (ICRA); IEEE, 2015; 8 Pages.
Kamol et al.; "RFID Based Object Localization System using Ceiling Cameras with Particle Filter"; Future Generation Communication and Networking (fgcn 2007); vol. 2; IEEE; Dec. 6, 2007; 8 Pages.
Katz et al.; "Perceiving, Learning, and Exploiting Object Affordances for Autonomous Pile Manipulation"; Autonomous Robots; vol. 37, No. 4; 2014; 8 Pages.
Kim et al.; "Direction Sensing RFID Reader for Mobile Robot Navigation"; IEEE Transactions on Automation Science and Engineering; vol. 6, No. 1; DOI: 10.1109/TASE.2008.2006858; Jan. 2009; 12 Pages.
Kim et al.; "Planning for Grasp Selection of Partially Occluded Objects"; 2016 IEEE International Conference on Robotics and Automation (ICRA); IEEE, 2016; 8 Pages.
Knepper et al.; "IkeaBot: An Autonomous Multi-Robot Coordinated Furniture Assembly System"; 2013 IEEE International Conference on Robotics and Automation (ICRA); May 6-10, 2013; 8 Pages.
Kober et al.: "Reinforcement Learning in Robotics: A Survey"; The International Journal of Robotics Research 32.11; Sep. 2013; 73 Pages.
Li et al.; "ID-Match: A Hybrid Computer Vision and RFID System for Recognizing Individuals in Groups"; Robot Personalities; Proceedings of the 2016 CHI Conference on Human Factors in Computing Systems; #chi4good, CHI 2016; 12 Pages.
Li et al.; "Making the Invisible Visible: Action Recognition Through Walls and Occlusions"; Proceedings of the IEEE/CVF International Conference on Computer Vision; 2019; 10 Pages.
Liu et al.; "Robust Linear Regression via lo Regularization"; IEEE Transactions on Signal Processing; vol. 66, No. 3; Feb. 1, 2018; 16 Pages.
Lu et al; "milliEgo: Single-chip mm Wave Radar Aided Egomotion Estimation via Deep Senor Fusion"; Proceedings of the 18th Conference on Embedded Networked Sensor Systems; Nov. 16, 2020; 14 Pages.
Luo et al; "3D Backscatter Localization for Fine-Grained Robots"; Proceedings of the 16th USENIX Symposium on Networked Systems Design and Implementation (NSDI'19); Feb. 26-28, 2019; 18 Pages.
Ma et al.; "Minding the Billions: Ultra-wideband Localization for Deployed RF Tags"; Proceedings of the 23rd Annual International Conference on Mobile Computing and Networking; Oct. 2017; https://doi.org/10.1145/3117811.3117833; 14 Pages.
Market Study Report, LLC; "Global Material Handling Robots Market Size to surpass USD 13.8 Billion in value in 2006"; Market Study Report; Mar. 30, 2020; 5 Pages.

(56) References Cited

OTHER PUBLICATIONS

Morrison et al.; "Closing the Loop for Robotic Grasping: A Real-time, Generative Grasp Synthesis Approach"; Apr. 14, 2018; arXiv preprint arXiv:1804.05172 (2018); 10 Pages.

Morrison et al.; "Multi-View Picking: Next-best-view Reaching for Improved Grasping in Clutter"; 2019 International Conference for Robotics and Automation (ICRA); IEEE, 2019; 7 Pages.

Motroni et al.; "A Multi-Antenna SAR-based method for UHF RFID Tag Localization via UGV"; 2018 IEEE International Conference on RFID Technology & Application (RFIS-TA); IEEE, 2018; 6 Pages.

MoveIt; "Moving Robots into the Future"; https://moveit.ros.org; Downloaded on Mar. 30, 2022; 6 Pages.

Nam et al.; "Planning for target retrieval using a robotic manipulator in cluttered and occluded environments"; arXiv:1907.03956[cs.RO]; https://doi.org/10.48550/arXiv.1907.03956; Submitted Jul. 9, 2019; 8 Pages.

Novkovic et al.; "Object Finding in Cluttered Scenes Using Interactive Perception"; 2020 IEEE International Conference for Robotics and Automation (ICRA); IEEE, 2020; 7 Pages.

Park et al.; "Autonomous Mobile Robot Navigation Using Passive RFID in Indoor Environment"; 2009 IEEE Transactions on Industrial Electronics; vol. 56, No. 7; Jul. 2009; 8 Pages.

Paszke et al.; "PyTorch: An Imperative Style, High-Performance Deep Learning Library"; Advances in neural information processing systems 32; 2019; 12 Pages.

Price et al.; "Inferring Occluded Geometry Improves Performance when Retrieving an Object from Dense Clutter"; arXiv preprint arXiv:1907.08770; 2019; 16 Pages.

Robotiqs; http://robotiq.com/products/2f85-140-adaptive-robot-gripper; 14 Pages.

Schaul et al.; "Prioritized Experience Replay"; arXiv:1511.05952[cs.LG]; https://doi.org/10.48550/arXiv.1511.05952; Submitted Nov. 18, 2015; 21 Pages.

Shangguan et al.; "The Design and Implementation of a Mobile RFID Tag Sorting Robot"; Proceedings of the 14th annual international conference on mobile systems, applications, and services; DOI: http://dx.doi.org/10.1145/2906388.2906417; Jun. 2016; 12 Pages.

Sucan et al,; "The Open Motion Planning Library"; IEEE Robotics & Automation Magazine; vol. 19, No. 4; Dec. 6, 2012; 11 Pages.

Wada et al.; "Joint Learning of Instance and Semantic Segmentation for Robotic Pick-and-Place with Heavy Occlusions in Clutter"; 2019 International Conference on Robotics and Automation (ICRA); IEEE, 2019; arxiv:2001.07481v1[cs.RO]; 7 Pages.

Wang et al.; "Dude, Where's My Card? RFID Positioning That Works With Multipath and Non-Line of Sight"; Proceedings of the ACM SIGCOMM 2013 Conference on SIGCOMM; 2013; 12 Pages.

Wang et al.; "RF-Compass: Robot Object Manipulation Using RFIDs"; Proceedings of the 19th annual international conference on Mobile computing & networking (MobiCom '13); 2013; 12 Pages.

Wang et al.; RF-Focus: Computer Vision-assisted Region-of-interest RFID Tag Recognition and Localization in Multipath-prevalent Environments; Proc. AMC Interact. Mob. Wearable Ubiquitous Techno.; vol. 3, No. 1, Article 29; Publication date Mar. 2019; 30 Pages.

Xie et al.; "Tell Me What I See: Recognize RFID Tagged Objects in Augmented Reality Systems"; Proceedings of the 2016 ACM International Joint Conference on Pervasive and Ubiquitous Computing; Sep. 12, 2016; 12 Pages.

Xu et al.; "iVR: Integrated Vision and Radio Localization with Zero Human Effort"; Proc. ACM Interact. Mob. Wearable Ubiquitous Technol., vol. 3, No. 3, Article 114; Sep. 2019; 22 Pages.

Yak, "A library for integrating depth images into Truncated Signed Distance Fields"; Downloaded Mar. 30, 2022; https://github.com/ros-industrial/yak_ros; 7 Pages.

Yang et al.; "A Deep Learning Approach to Grasping the Invisible"; IEEE Robotics and Automation Letters; Preprint Version; Accepted Jan. 14, 2020; 11 Pages.

Yang et al.; "Analysis of Kalman Filter-Based Localization for HIMR RFID Systems"; IEEE Journal of Radio Frequency Identification; vol. 3, No. 3; Sep. 2019; 9 Pages.

Zeng et al. "Robotic pick-and-place of novel objects in clutter with multi-affordance grasping and cross-domain image matching"; The International Journal of Robotics Research; DOI: 10.1177/0278364919868017; 2019; 16 Pages.

Zeng et al.; "Learning Synergies between Pushing and Grasping with Self-supervised Deep Reinforcement Learning"; 2018 IEEE/RSJ International Conference on Intelligent Robots and Systems (IROS); IEEE, 2018; 9 Pages.

Zeng et al.; "Multi-view Self-supervised Deep Learning for 6D Pose Estimation in the Amazon Picking Challenge"; 2017 IEEE International Conference on Robotics and Automation (ICRA); IEEE; May 29, 2017; 8 Pages.

Ratliff et al., "Chomp: Gradient Optimization Techniques for Efficient Motion Planning;" Proceedings of the 2009 IEEE International Conference on Robotics and Automation; May 12-17, 2009; 8 Pages.

Song et al., "3D Vision for Object Grasp and Obstacle Avoidance of a Collaborative Robot;" Proceedings of the 2019 IEEE/ASME International Conference on Advanced Intelligent Mechatronics; Jul. 8-12, 2019; 5 Pages.

U.S. Non-Final Office Action dated Nov. 24, 2023 for U.S. Appl. No. 17/530,603; 31 Pages.

Response to U.S. Non-Final Office Action dated Nov. 24, 2023 for U.S. Appl. No. 17/530,603; Response Filed Jan. 31, 2024; 19 Pages.

U.S. Final Office Action dated May 3, 2024 for U.S. Appl. No. 17/530,603; 10 Pages.

Response to U.S. Final Office Action dated May 3, 2024, Response Filed on Jul. 3, 2024 for U.S. Appl. No. 17/530,603;; 9 Pages.

U.S. Notice of Allowance dated Aug. 5, 2024 for U.S. Appl. No. 17/530,603; 7 Pages.

Kim et al., "Automated RObot Docking Using Direction Sensing RFID", IEEE, Apr. 10, 2007, 6 pages.

Wang et al. "RF-MVO: Simultaneous 3D Object Localization and Camera Trajectory Recovery Using RFID Devices and a 2D Monocular Camera", IEEE, 2018, 11 pages.

* cited by examiner

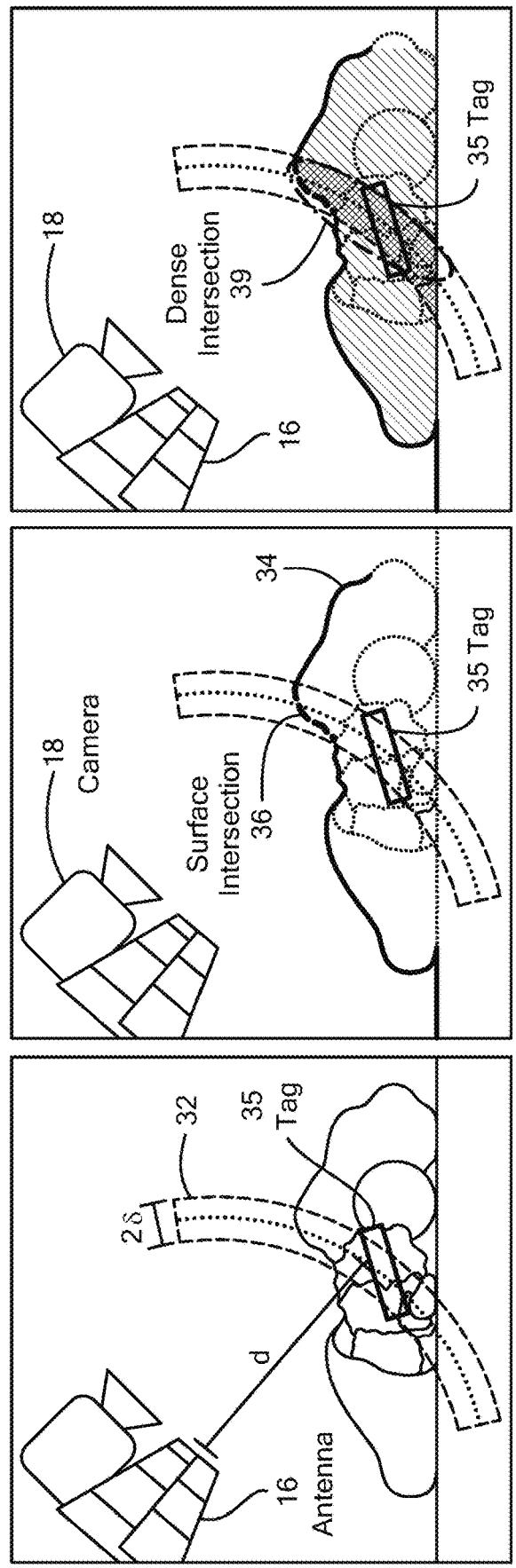

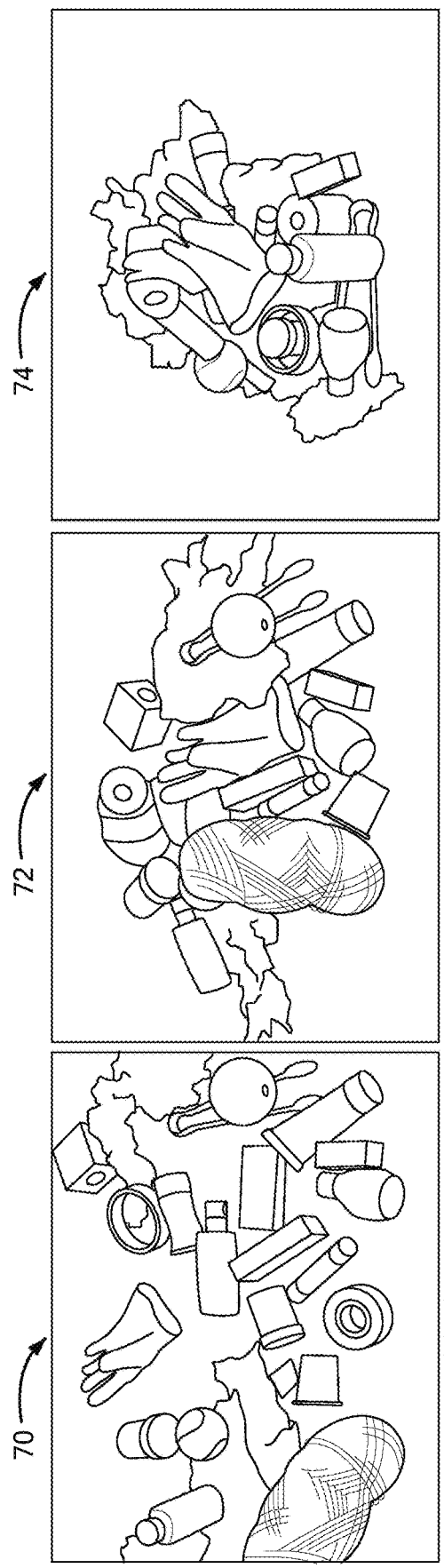
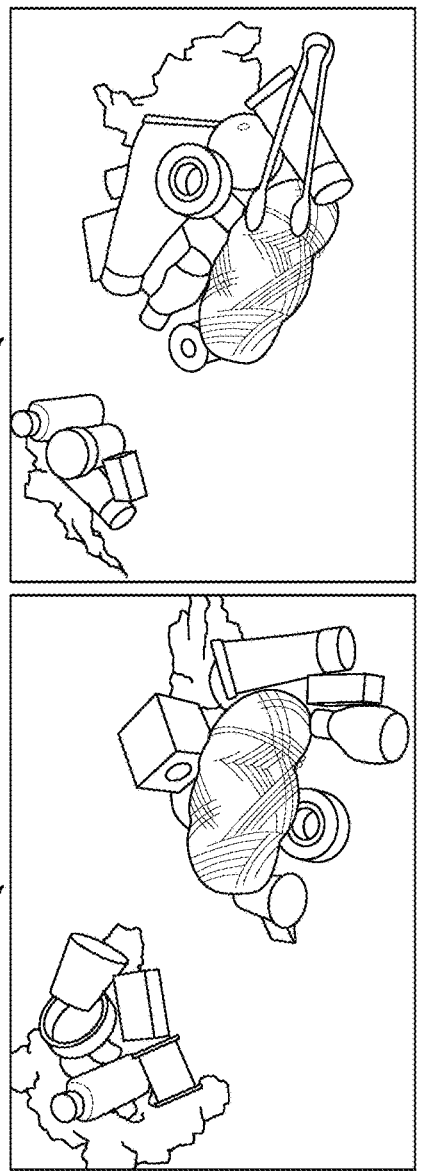
(A) LOS, Scattered
*FIG. 7A*
(B) LOS, 1 Pile
*FIG. 7B*
(C) NLOS, 1 Pile
*FIG. 7C*
(D) NLOS, 2 Piles
*FIG. 7D*
(E) NLOS, Big + Small Pile
*FIG. 7E*

(a) Travelled Distance (b) Localization Error

ROBOTIC GRASPING VIA RF-VISUAL SENSING AND LEARNING

CROSS-REFERENCE SECTION

This application claims the benefit of U.S. Provisional Application Ser. No. 63/232,698, filed on Aug. 13, 2021 the contents of which are hereby incorporated herein by reference.

BACKGROUND

The past few years have witnessed mounting interest in sensing technologies for robotic perception and automation. Remarkable progress in vision systems has enabled robots to perceive, locate, and grasp items in unstructured environments like warehouses, homes, and manufacturing plants. This progress has motivated large companies like Amazon, Uniqlo, and FedEx to adopt piece-picking robots, and it has led to the emergence of various piece-picking robotic technologies. This is driven, at least in part, by the enormous potential of picking robots in applications spanning e-commerce fulfillment, warehouse automation, and agile manufacturing.

A standard robotic task across many of these use cases involves retrieving target items in cluttered environments. E-commerce robots need to retrieve customer orders from under a pile. Similarly, furniture assembly robots need to retrieve certain tools (e.g., wrench), before they can start assembling furniture. The process of searching for and retrieving a target item is efficient when the item is visible. However, if the target item is fully occluded (or in some cases even partially occluded), robotic systems that rely on cameras cannot perceive it, and resort to a time consuming search process.

Motivated by the desire to efficiently search for and retrieve fully occluded objects, researchers have considered the use of radio frequency (RF) localization. Because RF signals can traverse many occlusions, these systems can identify and locate items of interest through occlusions and instruct the robot to navigate toward them, making the search process more efficient. However, existing systems that leverage RF localization for grasping make restrictive assumptions (about the objects and the environment) which limit their practicality. For example, some systems can only work with objects having certain shapes and the system require prior knowledge of the object's shape and/or orientation. In addition, these systems require a separate, dedicated infrastructure for RF localization and calibration. As a result, they can only work in constrained environments that have already been instrumented with the required infrastructure.

SUMMARY

In accordance with one aspect of the concepts described herein, the inventors have recognized it would be desirable to bring the benefits of RF localization to robotic grasping while delivering an infrastructure-less, shape-independent, and orientation-independent grasping system. The concepts, systems and techniques integrate both an RF localization module and an imaging device (e.g., a camera) into a robot (e.g., a robotic arm). This approach eliminates any requirement for instrumenting the environment in which a target object is located with a separate infrastructure. This approach also eliminates any requirement for an associated calibration process. With the imaging device and RFID localization antenna both integrated onto an end-effector of a robot, the system can exploit mobility of the robot to localize and grasp one or more target items independent of their shapes and/or orientations.

One challenge in designing systems which integrates RF and image information arises from the uncertainty about a target object's location and the environment in which the target object is located. In particular, since a target object may be hidden or outside a field of view of an imaging device (e.g., a camera's field of view), the robot cannot visually perceive it. Moreover, since if the robot has a single "wrist-mounted" antenna (and not a separate RFID localization infrastructure), it cannot directly localize the RFID.

The inventors have recognized that in principle, one could instruct the robot to maneuver its arm to scan the three-dimensional (3D) environment in order to accurately localize the RFID; however, such an approach would be time-consuming and inefficient. Yet, in the absence of accurate localization, the uncertainty region would be larger and the robot would need to grasp many objects in a pile before it finally picks up the target object. In other words, the uncertainty again results in a time-consuming and inefficient retrieval process.

In accordance with the concepts, systems and techniques, described is a fully-integrated robot that enables practical and efficient grasping in line-of-sight, non-line-of-sight, and fully-occluded settings. The described concepts, systems and techniques leverage imaging information and RF localization and assume that target objects are tagged with RFIDs and uses the RFID signals to sense the objects of interest through occlusions.

Accordingly. described is the first robotic system capable of grasping occluded objects using a single fully-integrated in-hand RF-visual end-effector. The system introduces two important innovations: (1) dense RF-visual geometric fusion; and (2) RF-visual reinforcement learning. These innovations allow planning of efficient trajectories for localization, grasping, and retrieval of one or more target objects.

The concepts. systems and techniques described herein find use in many applications including robotic retrieval tasks in complex environments such as warehouses, manufacturing plants, and smart homes.

DESCRIPTION OF THE SEVERAL VIEWS OF THE DRAWINGS

The manner and process of making and using the disclosed embodiments may be appreciated by reference to the figures of the accompanying drawings. It should be appreciated that the components and structures illustrated in the figures are not necessarily to scale, emphasis instead being placed upon illustrating the principals of the concepts described herein. Like reference numerals designate corresponding parts throughout the different views. Furthermore, embodiments are illustrated by way of example and not limitation in the figures, in which:

FIG. 2A is a block diagram which illustrates geometric fusion, combining RF measurements with visual point clouds to identify candidate locations for the target RFID-tagged item.

FIG. 2B is a block diagram which illustrates how RL-based RF-Visual control narrows down the candidate locations.

FIG. 2C is a block diagram which illustrates a robot successfully grasping a target object (also sometimes referred to herein as a target item) after decluttering its vicinity.

FIGS. 3A-3C are a series of diagrams which illustrates Dense RF-Visual Geometric Fusion in which an antenna takes a distance measurement which has a margin of error and maps it to a spherical ring (FIG. 3A); a depth camera is only able to observe the surface points of a pile, so the surface intersection region does not include the tagged item (FIG. 3B); and a known region between the surface and the largest plane is filled to create a dense point cloud. Now the intersection region includes the location of the tagged item (FIG. 3C).

FIG. 7A is an image of an evaluation scenario in which a target object is unoccluded with a pile of other objects.

FIG. 7B is an image of an evaluation scenario in which a target object is unoccluded with a pile of other objects.

FIG. 7C is an image of an evaluation scenario in which a target object is occluded by a pile of other objects.

FIG. 7D is an image of an evaluation scenario in which a target object is occluded by a pile of other objects.

FIG. 7E is an image of an evaluation scenario in which a target object is occluded by a pile of other objects.

FIG. 10 illustrates retrieval efficiency.

DETAILED DESCRIPTION

Figure 1:
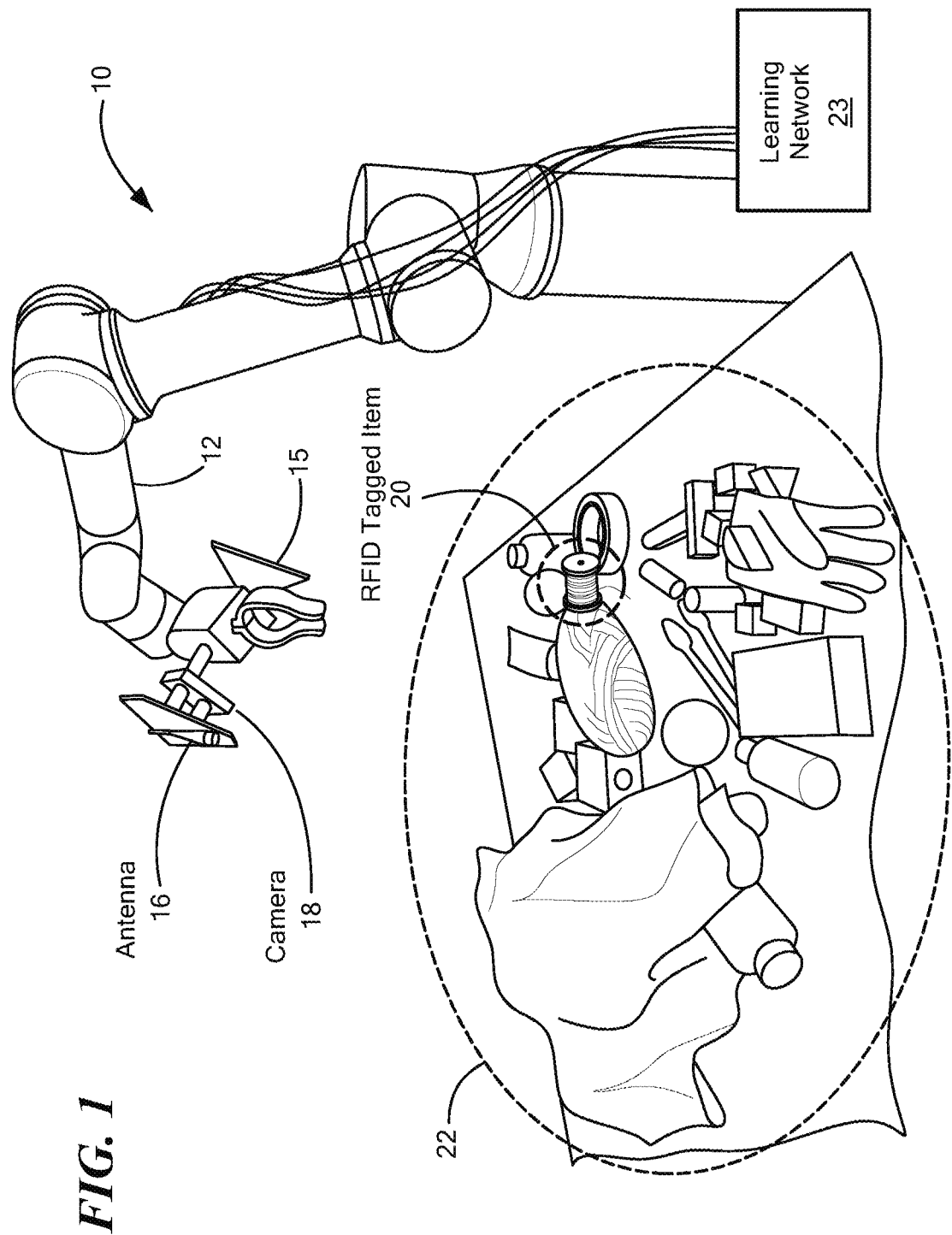
FIG. 1 is an image of a robotic system (referred to herein as RFusion) which fuses RF and visual sensor data (from wrist-mounted camera and antenna) to locate, maneuver toward, and grasp target objects (sometime referred to as target items) in line-of-sight, non-line of sight, and fully-occluded settings.

Before describing the details of a system which integrates both an RF localization module and an imaging device into a robot and associated techniques some introductory concepts are described. In general overview, described is a system and technique to efficiently search for and retrieve RFID-tagged items in a workspace. The system and techniques are sometimes referred to herein as RFusion. In embodiments, the system comprises a robotic arm with a wrist-mounted antenna and a depth camera (RGB-D). The system works with standard RFID tags (e.g., active or passive RFID tags such as UHF RFID tags) and common robotic arms having a number of degrees of freedom necessary to meet the needs of a particular application. In embodiments, robotic arms having six (6) degrees of freedom may be used. The system is capable of retrieving one or more target RFID-tagged items in line-of-sight as well as those occluded under a pile.

The system can operate with any number of RFID tags in the environment. To promote clarity in the description of the broad concepts sought to be protected, sometimes described herein are scenarios where the robot needs to retrieve a specific item (or an ordered list of items); thus, it is assumed that the robot knows the identifier of the target item's RFID. In practice, the mapping between an item and its identifier is listed in (online) databases provided by the manufacturer or distributor, for example. It is noted that the system described herein does not need to know exactly where the RFID is attached to the item, nor does it know where the RFID or target item are in its workspace.

The system starts by using its wrist-mounted antenna to selectively query the RFID on the target item. It then uses the RFID's measured response to compute the round-trip distance to the tag by leveraging state-of-the-art RFID positioning techniques. Since a single round-trip distance is not sufficient for localization, the robot fuses RF and visual information in order to efficiently localize, maneuver toward, and grasp the target object. It operates in 3 steps: (1) Dense RF-Visual Geometric Fusion; (2) RF-Visual Reinforcement Learning; and (3) RF-Visual Grasping all of which will be described in detail below.

Briefly, dense RF-visual geometric fusion operates as follows. Given the round-trip distance to the RFID, the robot maps that distance to a spherical ring centered around the wrist-mounted antenna. Subsequently, it geometrically intersects this spherical ring with the RGB-D data obtained from the wrist-mounted camera, resulting in a list of candidate locations.

Briefly, RF-visual reinforcement learning, operates as follows. After RF-visual geometric fusion, the robot needs to move its gripper to a new location in order to collect new RF and visual measurements. To do this, a reinforcement learning network was trained. The reinforcement learning network uses the history of RF and visual measurements to determine the optimal next vantage point to which the gripper should move. The robot moves to this new location, takes measurements, and repeats this step until it has sufficient confidence in its estimate location of the RFID-tagged item.

Briefly, RF-visual grasping operates as follows. Once a sufficiently-accurate location has been determined, RFusion uses the location estimate to grasp the object. After grasping, the wrist-mounted antenna can make an additional RFID measurement to verify that the target item has indeed been successfully grasped, and if not, attempt more grasps until the item of interest has been picked up.

Referring now to FIG. 1 a robotic system 10 (referred to herein as the "RFusion system" or more simply "RFusion") comprises a robotic member 12 (here illustrated as a robotic arm) having a radio frequency (RF) localization module 15 and an imaging system or imaging device 18 (e.g., a camera) integrated into the robotic member. The RF localization module comprises an antenna 16. In embodiments, the imaging system or imaging device and antenna are mounted on a wrist portion of a robotic arm. In the case in which the imaging device is provided as a camera, the camera and antenna are said to be provided as a wrist-mounted camera and antenna. In embodiments, an end-effector (e.g. a gripper) is mounted or otherwise coupled to an end of a robotic arm and an imaging system or device and antenna are mounted or otherwise coupled on or to a portion of the end-effector.

System 10 captures RF and visual sensor data (e.g., from the robotic arm mounted camera and antenna) which fuses RF and visual sensor data to locate, maneuver toward, and grasp target objects (also sometimes referred to herein as: "target items" or "targets of interest" or "objects of interest" or "items of interest") in line-of-sight, non-line of sight, and fully-occluded settings (where "fully-occluded settings" refer to environments in which the target-object either not-visible or not easily visible). Thus, systems provided in accordance with the concepts and techniques described herein, can locate and grasp objects in environments in which a target object is only partially visible or not at all visible.

Robotic system 10 thus comprises a fully-integrated robot that enables practical and efficient grasping in line-of-sight, non-line-of-sight, and fully-occluded settings. The RFusion system assumes that target objects are tagged with RFIDs. The RF localization module of the RFusion system can receive RFID signals via the antenna. Thus, RFusion system uses the RFID signals to sense one or more target objects through occlusions.

However, unlike prior art systems, system 10 is the first to integrate both an RF localization module and a camera or other imaging system or imaging device into a robotic arm itself as shown in FIG. 1. This approach eliminates requirements for instrumenting an environment with a separate infrastructure as well as any associated calibration process. With both an imaging device and an RFID localization antenna both integrated onto an end-effector of a robot, the system can exploit the arm's mobility to localize and grasp a target item independent of its shape or orientation.

System 10 further comprises an RF-visual reinforcement learning network 23. The processing performed by reinforcement learning network 23 will be described in detail further below. In general, however, reinforcement learning is suitable for the problem of fusing RF and visual information since it enables reducing a cumulative cost (e.g., a trajectory) after multiple actions. To simplify the learning problem, system 10 decomposes candidate locations of a target object into non-overlapping uncertainty regions that account for the resolution of RF sensing and the camera's depth map. This decomposition enables efficient training of the network entirely in simulation on a plurality of scenarios. Once trained, the network can be used by a physical robot to identify the optimal next vantage point, instruct its end-effector to move to the corresponding location, and iterate through the process, narrowing down the candidates until it has localized the target object.

System 10 uses the vantage points identified by learning network 23 to localize a target object's RFID. The location estimate is then provided as an attention mechanism to a vision-based grasping network. If the target item is under a pile, the robot can automatically remove items stacked above it, set them aside, and proceed to retrieving the item of interest. Once RFusion successfully retrieves the target object, it senses the proximity of the object's RFID to its wrist-mounted antenna and declares task completion.

Figures 2A, 2B:
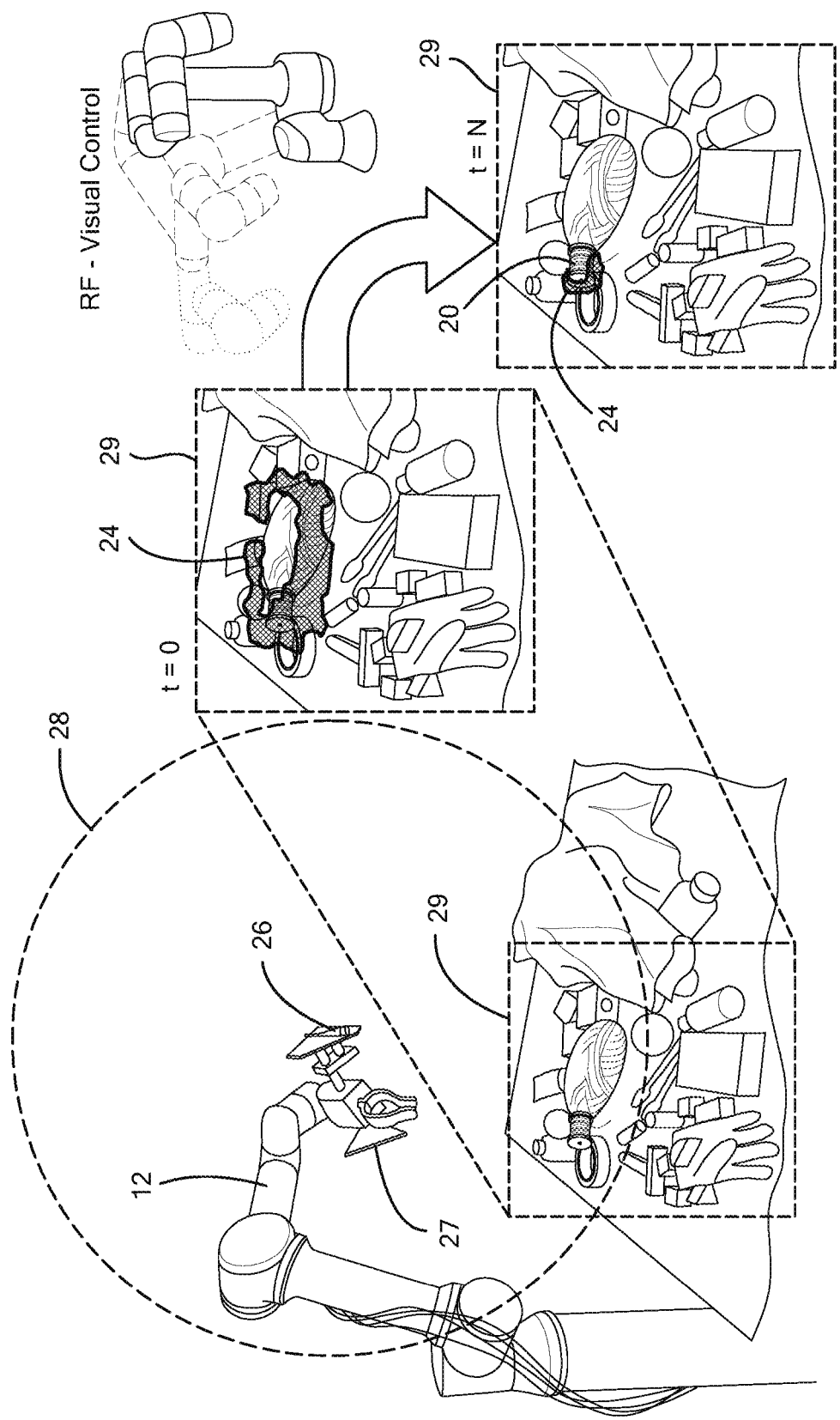
FIGS. 2A-2C are a series of block diagrams illustrating RF-Visual Sensor Fusion, Control, and Grasping.
Figure 2C:
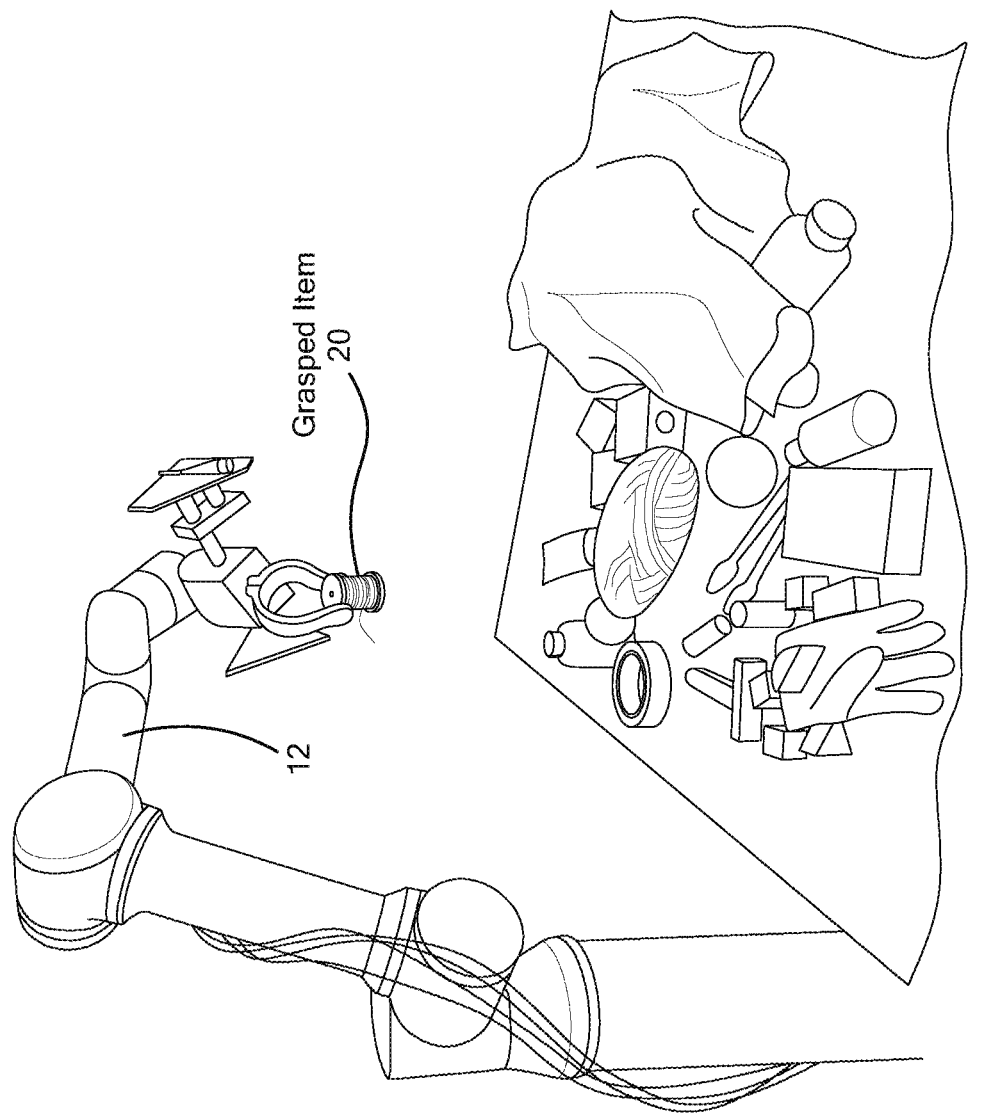

FIGS. 2A-2C illustrate RF-Visual Sensor Fusion, Control, and Grasping. FIG. 2A shows geometric fusion, combining RF measurements with visual point clouds to identify candidate locations for the target RFID-tagged item. FIG. 2B demonstrates how RL-based RF-Visual control narrows down the candidate locations 24. FIG. 2C illustrates robot 12 successfully grasping target item 20 after decluttering its vicinity.

The described concepts, systems and techniques overcome the challenges noted above via two new primitives: (1) dense RF-visual geometric fusion described below in conjunction with § 3 and (2) RF-visual reinforcement learning (RL) described below in conjunction with § 4.

In overview, the dense RF-visual geometric fusion primitive aims to reduce uncertainty about the target item's location by iteratively fusing RF and visual information. In particular, rather than treating RF and vision as independent perception modules, RFusion geometrically fuses them. FIG. 2A illustrates this concept. The antenna mounted on the robot's "wrist" region 26 (e.g., a region of robot arm 12 proximate end-effector 27) estimates the time-of-flight to the RFID on the target item and maps it to a round-trip distance (by accounting for the speed of propagation of RF signals). Given the round-trip distance from the antenna to the target item, the system localizes the RFID to a spherical surface 28 centered around the antenna. In parallel, RFusion uses a depth map obtained from its wrist-mounted camera to construct a 3D point cloud, corresponding to the occupied regions 29 in its visual field of view, shown in FIG. 2B. By geometrically intersecting the RF-computed sphere 28 with its 3D point cloud, RFusion can narrow down the target object's location to only a handful of candidates 24. RFusion extends this high-level idea with techniques to account for regions outside its field of view and for the resolution of localization.

Also, in overview, he RF-Visual Reinforcement Learning operates as follows: given the candidate locations from geometric fusion, one might assume that instructing the robot to simply approach the region where the candidate locations are most concentrated may be optimal. In practice, such an approach may lead to poor localization accuracy due to Dilution of Precision (DOP).

DOP is a well-known concept in GPS positioning and is the main reason why GPS does not perform well in canyons (or in streets with tall buildings). When a GPS receiver is in a canyon, it only obtains measurements from satellites close to each other in the sky, resulting in much poorer localization precision than when it obtains measurements from satellites that are further apart from each other.

In accordance with the concepts described herein, the inventors have recognized that a similar problem arises for an RFusion system. If the robot moves its end-effector (e.g. a gripper) directly toward candidate locations, its vantage points (analogous to satellites) would be close to each other, resulting in poor localization accuracy. Yet, if the robot moves its gripper further away from the candidate locations to obtain better localization accuracy, it would increase its overall trajectory for grasping since it needs to make its way back to the object for grasping. This results in poor overall efficiency.

To address this tradeoff, the problem may be cast as a trajectory minimization problem which maybe solved using an RF-visual reinforcement learning network. Reinforcement learning is suitable for this problem since it enables reducing (and ideally, minimizing) a cumulative cost (trajectory) after multiple actions (vantage points). To simplify the learning problem, RFusion decomposes the candidate locations into non-overlapping uncertainty regions that account for the resolution of RF sensing and the camera's depth map. This decomposition enables efficient training of the network entirely in simulation on a large number of scenarios. Once trained, the network can be used by a physical robot to identify the optimal next vantage point, instruct its end-effector to move to the corresponding location, and iterate through the process, narrowing down the candidates until it has localized the target object. This can be seen in FIG. 2B where the candidate regions 24 shrink (i.e., reduce in size) over time as the robot collects measurements from new vantage points.

The above two primitives may be used as a basis to design an end-to-end system capable of grasping complex objects, even if they are occluded under a pile. RFusion uses the vantage points identified by its learning network to localize the target item's RFID. Then, it feeds the location estimate as an attention mechanism to a vision-based grasping network. If the target item is under a pile, the robot can automatically remove items stacked above it, set them aside, and proceed to retrieving the item of interest. Once RFusion successfully retrieves the target object (as shown in FIG. 2C), it senses the proximity of the object's RFID to its wrist-mounted antenna and declares task completion.

These techniques are described in detail further below. Also described is how the system can recover from errors arising from RF polarization mismatch and outlier measurements. An end-to-end prototype of an system operating in accordance with the concepts described herein reproduces a state-of-the-art RFID localization system on BladeRF software radios. The system also uses a UR5e robot with an Intel RealSense D415 depth camera and log-periodic antennas mounted on its wrist (as shown, for example, in FIG. 1).

A prototype system operating in accordance with the concepts described herein and over 400 real-world experimental trials were conducted to evaluate the system. The evaluation demonstrates the following: (A) the prototype RFusion system can accurately grasp complex items in line-of-sight and non-line-of-sight settings, under occlusions, and across different orientations and it achieves centimeter-scale median localization accuracy in each of the x/y/z dimensions, and succeeds in 96% of trials across different scenarios; (B) a scanning baseline was implemented using a wrist-mounted antenna (i.e., an antenna-array baseline). The baseline achieves the same localization accuracy as the prototype RFusion systems full implementation, albeit achieves only 50% of RFusion's efficiency (i.e., the baseline system requires two-times more travel distance for localization and grasping); and (C) also performed were ablation studies to assess the benefits of RF-visual's geometric fusion and reinforcement learning network; these studies demonstrate that these components contribute equally to RFusion's efficiency gains over the baseline.

Dense RF-Visual Geometric Fusion

Next described is RFusion's first component—i.e., dense RF-visual geometric fusion. This component fuses RF and visual information to reduce the uncertainty about the target item's location, even when the item is fully occluded. For simplicity of explanation, RF-visual fusion is described using the example shown in FIGS. 3A-3C. The figures depict a scenario with a pile of objects on a table. The RFID-tagged target item 35 (depicted using a rectangle) is in the middle of the pile, hence occluded from the camera's field of view. The figure also shows the wrist-mounted antenna 16 and wrist-mounted camera 18. The fusion process is described in three steps as follows.

Step 1: RF-based Spherical Ring: First, an RFusion system which may be the same as or similar to the system of FIG. 1, uses the wrist-mounted antenna to estimate the time-of-flight to the RFID on the target item. It then maps the time-of-flight to the round-trip distance d by accounting for the speed of propagation of RF signals. This distance measurement limits the tag's possible location to the surface of a sphere centered on the antenna. Part of this sphere is shown as the dotted arc in FIG. 3A. Since the distance estimate has a certain resolution it constrains the tag's location to a 3D region 20 shown in the figure. Geometrically, this means that one can narrow the tag's position Ptag to a spherical ring centered around the in-hand antenna's location $P_{ant}$, such that the true antenna-tag round-trip distance must be within δ of the estimated round-trip distance. Eq. 1 formalizes this idea:

$$2\|P_{tag}-P_{Ant}\|-d<\delta \qquad (Eq.\ 1)$$

where δ represents that uncertainty of a given RF measurement. In embodiments 3.5 cm was selected which corresponds to the 90$^{th}$ percentile of the round trip accuracy of the system.

Step 2: Constructing a Dense 3D Point Cloud: Although the system can narrow the possible tag region down to the sphere 32 in FIG. 3A, this region can be large. Next, the system fuses visual information to further reduce its uncertainty about the target's location. The wrist-mounted camera captures a depth image of the work space and maps this image to a 3D point cloud. This point cloud is depicted with line 34 in FIG. 3B. Note that because the figure only shows a cross-sectional view, the intersection only appears as a line. One challenge is that the camera only obtains what is called a 2.5D image, which measures the distance to the closest surface for each of its pixels. In principle, RFusion can directly intersect this surface point cloud with the spherical ring 32, resulting in the surface intersection region 35. However, such an approach will allow only finding tag candidate locations that are already in the line-of-sight of the camera and would miss all objects that are behind occlusions (such as tag 40) here which sits below the surface of the pile).

To address this problem, the RFusion system extracts the largest plane in its visual field of view, which, in this case, corresponds to the tabletop 37 as shown in the bottom of FIG. 3C in black. This plane represents the furthest possible surface on which the target item can be. FIG. 3C shows how the system transforms its original surface point cloud into a dense point cloud by filling in the empty space from the surface point cloud to the largest plane (tabletop). The largest plane surface is also extended with points to allow intersections outside the field of view; this enables the system to localize objects not in its initial field of view. The system now has a dense point cloud p that contains all candidate locations based on the visual information.

Step 3: Dense RF-Visual Fusion: Next, the RFusion system geometrically intersects the spherical ring from Eq. 1 with the dense point cloud to identify all the candidate locations for the RFID-tagged item. The intersection region is denoted with reference numeral 39 in FIG. 3C, demonstrating a significant reduction in the robot's uncertainty about the target object's location. Mathematically, one can narrow down the tag's location to the set I of all points $P_{ptcloud}$ that satisfy:

$$\forall\ p_{ptcloud} \in I : |2\|p_{ptcloud} - P_{Ant}\| - d| < \delta \qquad \text{(Eq. 2)}$$

Two additional points may be noted: (1) in very simple scenarios, the geometric fusion algorithm alone may be sufficient to localize the target item. For example, if the table has a small number of target items and the spherical ring intersects with only one of them, RFusion can localize the item immediately using geometric fusion. In contrast, neither vision alone nor RF alone is sufficient to localize in one shot; and (2) RFusion performs two more optimizations to reduce the computational complexity of the subsequent stages. Specifically, it sub-samples the dense point cloud by 60% in comparison to the highest possible resolution by the camera. Moreover, in order to eliminate outliers from errors in the vision sensor, it clusters the viable point cloud intersections/using k-mean clustering. Instead of all points in I, the set of cluster centers C represents the possible item locations in the subsequent stages of RFusion's design. It should be noted that empirically, it has been found that k=4 performs well. It should also be noted that the clusters change across subsequent fusion iterations.

RF-Visual Reinforcement Learning

Above was discussed how RFusion uses geometric fusion to narrow down the possible object location to a region of candidates. However, to grasp and retrieve an item, a single accurate location is needed. Hence, RFusion needs to collect measurements from different vantage points. One approach is to simply instruct the robot to move toward the center of the region containing the candidate locations, and to collect measurements along the way. However, such an approach would result in bad localization accuracy due to the narrow spacing between antenna measurement positions. Another approach is to maximize the antenna aperture by obtaining measurements from the furthest possible locations in the workspace. While this will improve the localization accuracy, it will also increase the traveled distance to the grasping point, making the system inefficient. On top of this, RFusion can only partially observe the environment through its wrist mounted camera, which yields additional uncertainty about the environment.

To address these problems, RFusion introduces a reinforcement learning (RL) framework that uses visual data and RF measurements to identify an efficient trajectory for collecting vantage points. A general RL framework uses an agent that takes observations of the environment, determines an appropriate action, and applies that action in the environment. In this section, the manner in which RFusion leverages RF-Visual Encoding to enable sample-efficient training of the RL agent is first explained. After that, discuss is how this encoding is factored into the RL Network for training. Finally, described is the localization process based on visual and RF data.

RF-Visual Encoding

One goal of RFusion's RL agent is to choose vantage points (and ideally, optimal vantage points) to take measurements from in order to reduce (and ideally, minimize) the traveled distance until grasping and maximize the localization accuracy. At a high level, this means the RL agent should find antenna positions that both move it closer to the target item (whose location isn't fully known) and reduce the localization uncertainty. To efficiently train the RL agent on this task, a feature representation of the environment's observation that encodes both visual and RF data was developed. Specifically, three feature categories that provide the necessary information for optimizing the trajectory are used: 1) RF Features 2) Visual Features and 3) Positional Features.

Considering first, RF features, to obtain an accurate position estimate, one needs to take many distance measurements over a wide aperture due to dilution-of-precision (DOP). RF DOP measures the uncertainty of positioning due to the antenna vantage points.

Figure 4B:
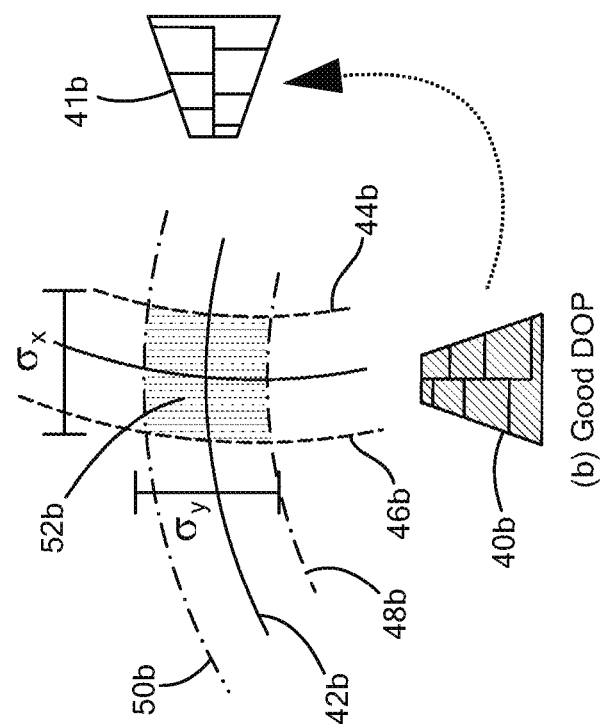
FIG. 4B is a diagram is a diagram illustrating good dilution-of-precision (DOP).
Figure 4A:
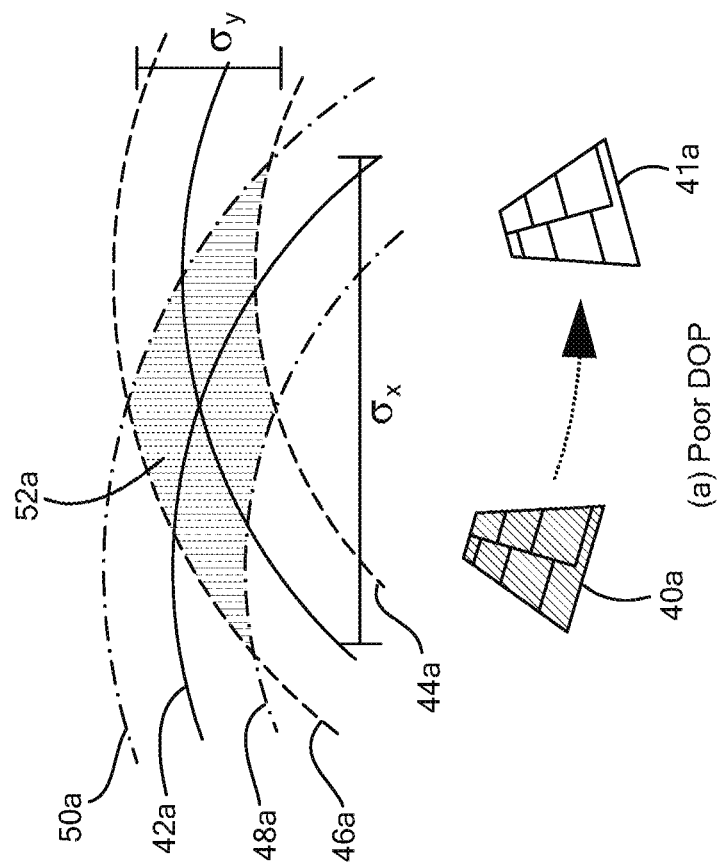
FIG. 4A is a diagram illustrating poor dilution-of-precision (DOP).

In FIGS. 4A, 4B, illustrated are two distance measurements from two vantage points 40a, 41a (FIG. 4A) 40b, 41b (FIG. 4B). The solid lines 42a, (FIG. 4A) and 42b (FIG. 4B) represent the distance measurements (d1, d2), and the dotted lines 44a, 46a, 48a, 50a (FIG. 4A) and 44b, 46b, 48b, 50b (FIG. 4B) represents the error margin of δ. The shaded areas 52a, 52b in the middle of FIGS. 4A, 4B respectively, represent the uncertainty about the tag location that is caused by the resolution of distance estimation. The uncertainty can be approximated by ($\sigma_x$, $\sigma_y$) along x and y axes.

FIG. 4A is a diagram illustrating poor RF dilution-of-precision (DOP). In FIG. 4A, the distance measurements are obtained from nearby vantage points and the uncertainty area is large. Thus, FIG. 4A measures the uncertainty of positioning due to the antenna vantage points.

Solid lines 42a (FIG. 4A), 42b (FIG. 4B) represent the distance measurements ($d_1$, $d_2$) and dotted lines 44a-50a (FIG. 4A) and 44b-50b (FIG. 4B) represent the error margin. The areas 52a (FIG. 4A), 52b (FIG. 4B) represent the uncertainty about the tag location that is caused by the possible errors in measurements. In FIG. 4A, the antenna vantage points 40a. 41a are relatively close (e.g., compared with vantage points in FIG. 4B), leading to a relatively large uncertainty (e.g., compared with uncertainty in FIG. 4B). Thus, FIG. 4B illustrates how well-located vantage points 40b, 41b lead to a good DOP and lower uncertainty.

It should thus be appreciated that FIG. 4B is a diagram illustrating good dilution-of-precision (DOP). In contrast to FIG. 4A, in FIG. 4B, the distance measurements are obtained from further vantage points, so the uncertainty area is smaller. In FIG. 4A, the antenna vantage points are closer than those in FIG. 4A, which results in a large uncertainty while FIG. 4B shows how well-located vantage points lead to a good DOP and thus lower uncertainty.

It should be appreciated that, for simplicity, FIGS. 4A, 4B illustrate the DOP concept in two-dimensions (2D), but those of ordinary skill in the art will appreciate the DOP concept may be extended to three-dimensions (3D) without undue experimentation.

The above formulation described the DOP assuming there is full knowledge of the tagged item's ground-truth location. However, when optimizing a robot's trajectory for localization, the tagged item's location is unknown. To deal with this uncertainty, the DOP may be approximated using a geometric center of candidate target-objects identified the using RF-visual fusion technique described above. It is noted this technique generalizes to scenarios where there are one or more disjoint candidate regions.

The DOP is composed of three values, ($\sigma_x$, $\sigma_y$, $\sigma_z$) which represent the RF uncertainty along the corresponding axes.

Intuitively, a large a along a given axis indicates a high uncertainty in that direction, and thus, a need to take additional measurements in new positions along that axis. The DOP calculation is formally specified in Eqs. 3 and 4 where $(x_i, y_i, z_i)$ correspond to the location of the antenna at vantage point I; $(x_u, y_i, z_u)$ correspond to the coordinates of the geometric center of the candidates; N is the number of vantage points that RFusion has taken measurements from; and $R_i$ is one-half of the round trip distance estimate of measurement.

$$A = \begin{bmatrix} \frac{x_1 - x_u}{R_1} & \frac{y_1 - y_u}{R_1} & \frac{z_1 - z_u}{R_1} \\ \frac{x_2 - x_u}{R_2} & \frac{y_2 - y_u}{R_2} & \frac{z_2 - z_u}{R_2} \\ \vdots & \vdots & \vdots \\ \frac{x_N - x_u}{R_N} & \frac{y_N - y_u}{R_N} & \frac{z_N - z_u}{R_N} \end{bmatrix} \quad \text{(Eq. 3)}$$

$$Q = (A^T A)^{-1} \quad \text{(Eq. 4)}$$

$$DOP_{RF} = \sqrt{tr(Q)} = \sqrt{\sigma_x^2 + \sigma_y^2 + \sigma_z^2} \quad \text{(Eq. 5)}$$

The RF Features may be summarized using $(\sigma_x, \sigma_y, \sigma_z)$. It should be noted that $$Q = \lfloor \sigma_{i,j}^2 \rfloor_{ij}.$$

Considering next, visual features, RFusion can only begin using RF-DOP after at least three vantage points (as per Eq. 3). To bootstrap its RL network using a single vantage point, RFusion uses the candidate region identified in geometric fusion (§ 3). The same intuition behind RF-DOP can be used and adapted to represent the uncertainty of the fused region.

Figure 5:
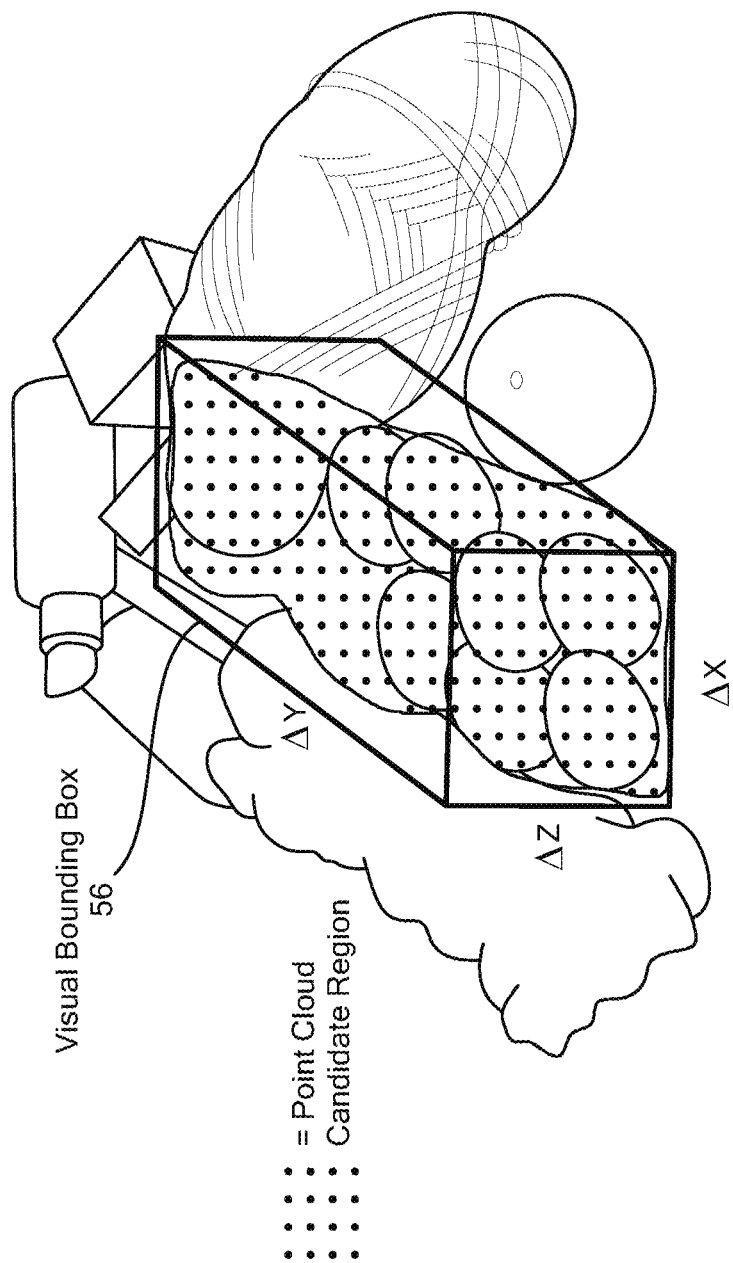
FIG. 5 is an isometric view of a visual bounding box of visual features which represents uncertainty of a fused region where a fused is a region identified using fused RF and image information).

FIG. 5 is an isometric view of a bounding box 56 of visual features. The visual features capture the uncertainty of the point cloud candidate regions using a bounding box. A longer edge represents more uncertainty in the corresponding dimension. FIG. 5 thus illustrates an example based on the scenario described earlier. The dots indicate the region of point cloud candidates based on the results from a dense geometric fusion operation. Box 56 is a bounding box of these candidates, with the box axes aligned with the X, Y, Z coordinate axes. Similar to RF-DOP, a large candidate region along a certain axis suggests a greater uncertainty along that axis. Thus, the length of the bounding box may be measured and used to represent visual uncertainty encoding: $(\Delta X, \Delta Y, \Delta Z)$.

Considering next positional features, the position of the antenna relative to the target location impacts the optimal trajectory. Intuitively, if the antenna is near the item of interest, a small movement significantly changes the angle of the measurement and sharply decreases DOP. In contrast, if the antenna is far from the item, the same amount of movement results in a smaller change in the angle of the measurement, and the DOP will not improve as much. Thus, to reduce the Visual and RF uncertainty while also encouraging movement toward the final grasping location, the candidate locations may be encoded with respect to the robot's gripper.

Specifically, a displacement vector may be determined. In embodiments, the displacement vector may be computed as follows:

$$\text{Displacement} = \frac{1}{|C|} \sum_{p_i \in C} P_{gripper} - p_i \quad \text{Eq. (6)}$$

in which:
$P_{gripper}$ is the robot's gripper location, and
$p_i$ is a center of a cluster of the point cloud candidates C.

RFusion Network

With a feature representation that encodes position uncertainty from the observations, an RFusion system can leverage reinforcement learning to optimize for efficient item retrieval.

In reinforcement learning, an agent is rewarded based on its performance on a task. During training, the agent learns how to maximize its reward, resulting in solving the task or optimization problem. In the case of RFusion, the agent is rewarded based upon the traveled distance to the grasping point and the number of vantage points until it successfully localizes the target item. The reward can be formulated as:

$$R = \zeta - \beta d_{total\ distance} - \eta N_{actions}$$

in which:
$\zeta$, $\beta$ and n are scalar weights;
$N_{actions}$ is the number of vantage points; and
$d_{totaldistance}$ is the overall traveled distance from the initial pose until the grasping point.

It should be noted that in one example implementation, the hyper-parameters are set as follows: $\zeta=5$, $\beta=1$ and $\eta=0.1$.

To formalize the above approach, at a given time step t, the RL agent uses a policy $\pi$ to decide on a robot action $a_t$ (e.g., moving in a specific direction) based on the input observations. For training, scene objects, depth camera measurements, RF measurements, and robot movements were simulated such that the simulated environment's state transitions are based on the agent's action. After each transition, RFusion's observation of the environment is updated, and the new state information t+1 is passed to the RL agent via the RF-Visual feature encoding. Once the item is successfully localized, the agent is rewarded with $_t$,[7] and the simulation trial ends. This RL problem can be solved using a standard Q-Network, where $(_t, _t)$ estimates the expected reward at the state $_t$ when taking the action $_t$ according to the policy $(_t)$. Q-learning is the process used to update the values, and it can be defined as:

$$Q(s_t, a_t) \leftarrow Q(s_t, a_t) + D\left[r_t + \gamma \max_a Q(s_{t+1}, a) - Q(s_t, a_t)\right]$$

in which:
$r_t$ is a reward the agent receives after $a_t$;
D is a learning rate; and
$\gamma$ is discount factor.

The agent is trained across episodes until the target item is localized. Thus, the RL network enables RFusion to learn a policy that optimizes the robot trajectory for successful grasping.

Robust Localization

Next described is the manner in which RFusion localizes a target object.

Robust Trilateration

Recall that each distance measurement from a vantage point constrains the tag's location to a sphere. With only three distance measurements, one can localize a tagged item by intersecting the three spheres (but the localization accuracy may be poor). Once additional measurements are made, the trilateration problem becomes over-constrained, and can be solved using robust least-squares with outlier rejection.

Handling Tag Orientation

Up until now, the impact of the tag's orientation on RFusion's ability to sense and localize it have been ignored.

However, RFusion uses compact linearly polarized antennas mounted on its wrist. These antennas cannot get distance measurements when they are perpendicular to the tag direction due to polarization mismatch. To overcome this, RFusion detects and compensates for polarization mismatch.[8] Specifically, it measures the signal-to-noise ratio (SNR) of the tag's received signal. If the SNR is below a threshold (3 dB), RFusion rotates the gripper until the SNR improves. This approach ensures that RFusion can accurately measure the tag's location regardless of its initial orientation.

RF-Visual Grasping

Once RFusion has localized the target RFID, it proceeds to the grasping phase. Here, it faces two challenges: first, even if the target item is in LOS, the RFID's location alone is not enough for grasping. This is because grasping complex objects (e.g., a screwdriver) doesn't just require any location on the object, but also a grasping strategy. Second, the target item may be occluded under a pile, necessitating a decluttering process prior to retrieval.

Figure 6:
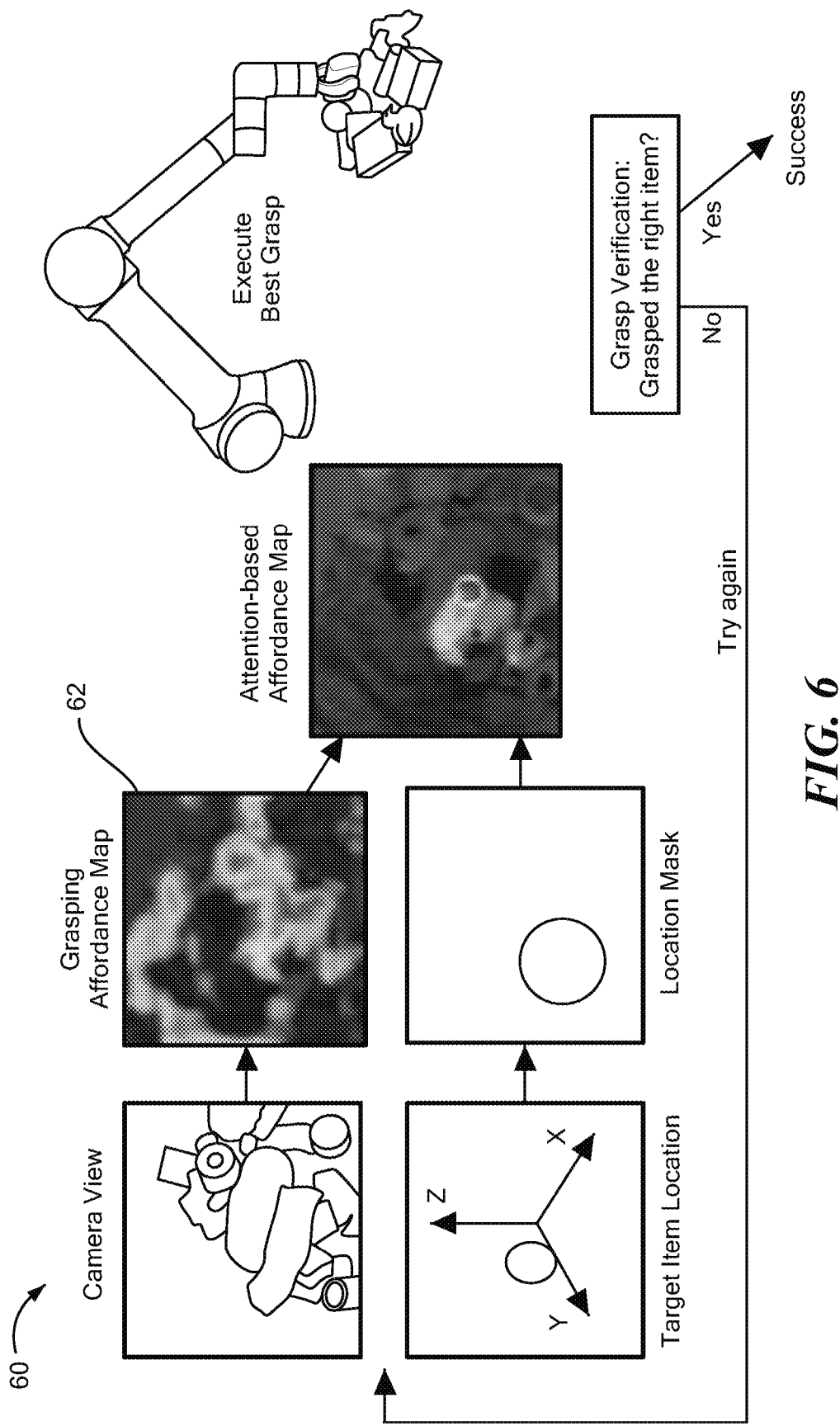
FIG. 6 is a block diagram of a system operating in accordance with the concepts describe herein comprising a GG-CNN grasping network to calculate or otherwise generate a grasping affordance map of a scene based upon RGB-D information.

To deal with these challenges, RFusion feeds the RFID's estimated location as an attention mechanism to a state-of-the-art vision-based grasping network. This approach allows RFusion to inherit the benefits of that network while extending it to retrieve occluded items. FIG. 6 illustrates this idea through an example scenario.

Referring now to FIG. 6 a system 60 operating in accordance with the concepts described herein, comprises a neural network grasping network to calculate or otherwise generate a grasping affordance map 62 of a scene based upon RGB-D information. A binary mask is used to focus the attention of the system on objects near the target item. RFusion performs the best grasp from this attention-based affordance map, and declarers task completion or re-attempts grasping based on the ID of the grasped item. After RFusion localizes the RFID, the robot moves its gripper above the object in the x-y plane. The wrist-mounted camera captures an RGB-D image and feeds it to a neural network. In embodiments the neural network may be provided as a deep convolutional neural network. In embodiments, the deep convolutional neural network may be a GG-CNN deep convolutional neural network. The neural network outputs predicted grasping qualities, grasping angle, and gripper width for each pixel in the image. Since RFusion knows the target's location, it knows that it should either directly grasp the target item or remove what is on top of it. To do so, a circular binary mask is applied centered $a_t$ the target object's location to the quality map, and select the highest quality grasp within this mask. It should, of course, be appreciated that RFusion can also adapt the radius of the mask to the target object's dimensions.

Grasping Verification: RFusion can verify whether it has picked up the target item. To do so, after grasping, the robot can measure the distance to the target item's RFID. Since a grasped item is expected to be in the gripper (and close to the antenna), the distance can be used to determine if it was successful. If RFusion determines that it has grasped a non-target item (e.g., clutter), the robot can discard the item. The robot can repeat this process until it succeeds.

Recovering from Errors: An unsuccessful grasping attempt (e.g., due to grasping a wrong item or clutter) might inadvertently move the target item. To detect this, RFusion can obtain a new distance measurement before re-attempting to grasp. If the measurement indicates that the target item has moved from its previous location (but still not in the robot's gripper), RFusion can perform another localization round to discover the item's new location.

Implementation

Real-World Setup

Physical Setup: In one example embodiment RFusion was implemented on a Universal Robots UR5e robot with a Robotiq 2F-85 gripper, an Intel Re-alsense D415 depth camera, and Nuand BladeRF 2.0 Micro software radios. The camera and two WA5VJB Log Periodic PCB antennas (850-6500 MHz) were mounted around the robot's wrist, using a 3D printed fixture (e.g., as shown in FIG. 1. The system was tested with standard off-the-shelf UHF RFID tags (e.g., the Smartrac DogBone RFID tags with Monza R6-P Chips) attached to standard everyday objects, office supplies, and kitchen items including gloves, plastic bottles, toys, tape rolls, stress balls, chalk boxes, and thread skeins.

RFID Localization: To obtain 1D distance estimates from the wrist-mounted antennas to the RFIDs, a state-of-the-art RFID localization system was reproduced on BladeRF software radios. In contrast to prior systems which require installing multiple antennas to obtain a tag's 3D location, the system described herein is limited to a single transmit-receive antenna pair mounted on the wrist. Hence, only the round-trip distance to an RFID (i.e., 1D localization) is estimated. It should be noted that since transmit and receive are separate, the sphere 28 described above in conjunction with FIG. 2A is a spheroid having two foci. The 1D localization implementation requires two BladeRF software radios: the first implements the standard EPC Gen2 protocol and transmits a signal within the ISM band (at 910 MHz) to power up the RFIDs; the second is clock-synchronized to the first and transmits a low-power signal, hopping its frequency from 950 MHz-1200 MHz in 27 MHz steps to produce a wide-band channel estimate of the tag's channel. Each hopping sequence requires 150 ms and is used to estimate the round-trip distance to the tag. A Mini-Circuits ZAPD-21-S+ splitter (0.5-2.0 GHz) splits the received signal between the two BladeRFs. The described implementation performs two additional optimizations to improve localization accuracy over previous work. First, channel estimates whose SNR is below 3 dB are discarded so that the bad measurements do not negatively impact localization. Second, if more than 10 frequencies are below the SNR threshold, the wideband estimation is repeated up to 4 times before moving the gripper to another vantage point.

Control Software: The system was developed and tested on Ubuntu 16.04 and ROS Kinetic. A ROS-native inverse kinematic solver, MoveIt, may be used to control the UR Robot Driver package. The solver is invoked whenever the robot needs to move to a new pose, as provided by the RL-network described above or the above-described grasping network. ROS was used for all inter process communications between the controller, camera, and BladeRFs.

Simulation

Recall from the above description that RFusion can be trained entirely in simulation. A simulation environment was built to train the RL-network to optimize the robot trajectory for localization and grasping. CoppeliaSim was used for the simulation environment and Bullet Physics 2.83 for the physics engine. The tool of the UR5 robot was simulated attached to a simulated camera and antenna.

200 different scenes were created with 0-3 piles of 35 objects in the simulation. For example, in the case of 3 piles, 3 pile locations were randomly specified in the workspace. Each object is randomly allocated to a pile and dropped from a random pose centered around the pile center. For each training episode, one of the 200 scenes was randomly choosen and then a random object in the scene to be the item of interest, which gives 7,000 possible different training episodes (200 scenes×35 objects). In each iteration of an episode, a round trip distance is calculated based on the simulated antenna and tag's positions. Gaussian noise is added to this distance to simulate real RF measurements' errors. The simulated camera also captures a depth image from the scene. This depth image is used to create a point cloud for RF-Visual fusion. The observation of the scene is fed to the RFusion Network, and the simulated robot's tool moves based on the result of the Q-Network. When the location estimates converge or too many measurements are made, the episode ends, the Q-Network is rewarded, and a new episode starts.

Learning Networks

An RF-visual RL Network was implemented as Q-Network with PyTorch. Adam optimizer was used for training. The reward discount factor was set to 0.9. The buffer size and minimum buffer size for training were set to 1500. The batch size of 128 was used for training. The network was trained for 11000 iterations. The training was performed on a machine running Ubuntu 16.04 with graphics card RTX 2080Ti, Intel Core i9, and 64 GB DDR4 RAM.

RF-Visual Grasping Network

For grasping, a GG-CNN network was implemented using code and pre-trained weights which may be adopted from prior art systems (e.g. Morrison, Douglas and Corke, Peter and Leitner, Jürgen. 2018. GG-CNN Code. https://github.com/dougsm/ggcnn). The RF-based attention described above is implemented as a 5 cm circular binary mask centered at the RFID estimated location.

Evaluation

An RFusion system was evaluated in a multi-path-rich indoor environment, placing target items on top of a wooden table under piles of objects. The environment is a standard office building, fully furnished with tables, chairs, and computers. Similar to prior localization systems for piece-picking robots, the robot's workspace measures roughly 0.7 m×1 m×0.3 m atop a wooden table.

The RFusion system was evaluated in in five different categories of scenarios (evaluation scenarios). Evaluations were performed ed with varying levels of complexity as shown in FIGS. 7A-7E. Each scenario had one or more target items (each tagged with an RFID) in addition to 5-15 non-target items to distract from or hide the targets. The scenarios included both line-of-sight (LOS) and non-line-of-sight (NLOS) settings where there were 0-2 distinct piles of objects on the table. In NLOS settings, the item of interest was fully occluded by at least another larger item in the pile.

Ground truth: An OptiTrack system was used to obtain ground truth tag location. In NLOS scenarios, ground truth locations were recorded before covering the item of interest with other objects. Because the tag is rectangular, localization accuracy was calculated by measuring the distance to the closest point on the tag.

Micro-Benchmarks

Micro-benchmark experiments were performed to understand the impact of different parameters on RFusion's overall performance.

Number of Vantage Points

Recall from the description above that RFusion needs at least three vantage points to compute an RFID's 3D location. In a first micro-benchmark experiment, the number of vantage points were varied in order to understand the impact of increased vantage points on localization accuracy and traveled distance.

Sixteen (16) experimental trials in ten (10) different scenarios, spanning all five categories described above were performed. In each of these trials, the RFusion system was allowed to obtain RFID channel measurements from up to 13 vantage points. For a given number of vantage points, all available measurements were used to estimate the RFID's location as discussed above. A localization error was computed or otherwise determined as the euclidean distance between the RFusion-estimated location and the ground-truth RFID location. The traveled distance was determined as the total distance traversed by the gripper from its initial vantage point all the way to the grasping point.

Figure 8A:
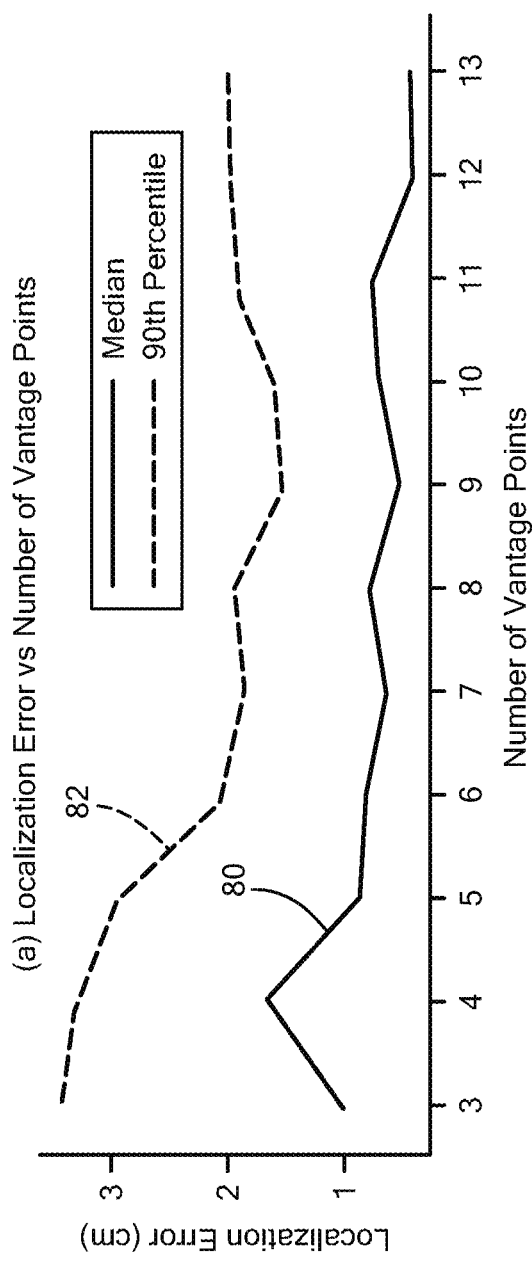
FIG. 8A is a plot of localization error vs number of vantage points.
Figure 8B:
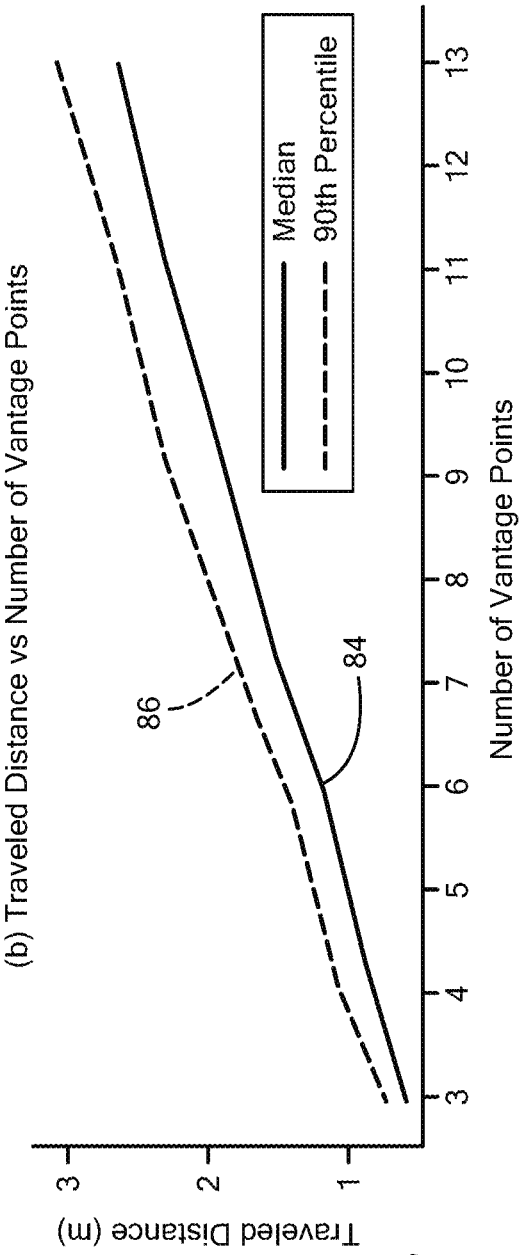
FIG. 8B is a plot of travelled distance vs. number of vantage points.

FIGS. 8A and 8B are plots of localization error and traveled distance as a function of number of vantage points. Lines 80, 84 show the median and the dotted lines 82, 86 shows the $90^{th}$ percentile. FIGS. 8A, 8B illustrate the impact of the number of vantage points.

FIG. 8A shows the median (solid curve 80) and $90^{th}$ percentile (dashed curve 82) of the localization error. As can be seen from FIG. 8A, as the number of vantage points increases, the median and $90^{th}$ percentile error both decrease until a certain level, then plateau. In particular, the $90^{th}$ percentile drops from 3.5 cm to around 2 cm, and the median drops from 1 cm to 0.43 cm with 13 vantage points. This is expected since more measurements enable higher localization accuracy but with diminishing returns. More importantly, the plot shows that the RFusion's median localization accuracy is around 1 cm even with only three vantage points, yet the $90^{th}$ error requires 6 measurements before it reaches 2 cm and plateaus.

FIG. 8B shows the median (solid curve 84) and $90^{th}$ percentile (dashed curve 86) of the traveled distance. As be seen from FIG. 8B as the number of vantage points increases, the median and $90^{th}$ percentile traveled distance consistently increase. This is expected because collecting vantage points requires moving the gripper to additional locations, thus increasing the overall traveled distance.

The above findings demonstrate that, in principle, one could always collect measurements from 6-7 vantage points to achieve higher localization accuracy. However, doing so would incur additional overhead on the traveled distance, reducing the overall efficiency of RFusion's grasping and retrieval process. This motivates the need for a mechanism that enables RFusion to determine when the target item has been sufficiently localized for grasping while avoiding unnecessary overhead.

Selecting a Stopping Criterion

The goal of a second micro-benchmark experiment was to identify the stopping criterion for RFusion's RL network. The stopping criterion defines when the system accepts its RFID-estimated location as correct, prompting it to stop collecting measurements from additional vantage points and proceed to the grasping phase. One option is to always collect measurements from a fixed number of vantage points, e.g., six vantage points to meet the $90^{th}$ percentile error of 2-cm as per the above micro-benchmark. However, fixing the number of vantage points to six would not be ideal since it incurs unnecessary overhead (traveled distance). As shown in § 8.1, more than half the trials require no more than 3 vantage points to achieve 1 cm localization accuracy. Ideally, one would like to identify a stopping criterion that achieves accurate localization (1-2 cm) using the minimum number of vantage points.

Thus, six potential stopping criteria were investigated using the same 16 trials from the above experiment. Each stopping criterion was defined by the amount of change in the tag's estimate location across 2-3 consecutive vantage points. For example, a stopping criterion of (1 cm, 3") corresponds to a change in the estimate location of less than 1 cm across the past three consecutive vantage points. The following stopping criteria were tested: (1 cm, 3"), (4 cm, 3"), (6 cm, 3"), (1 cm, 2"), (4 cm, 2"), (6 cm, 2"). Both the traveled distance and the localization error were computed across the trials whenever each stopping criterion is met.

Figure 9:
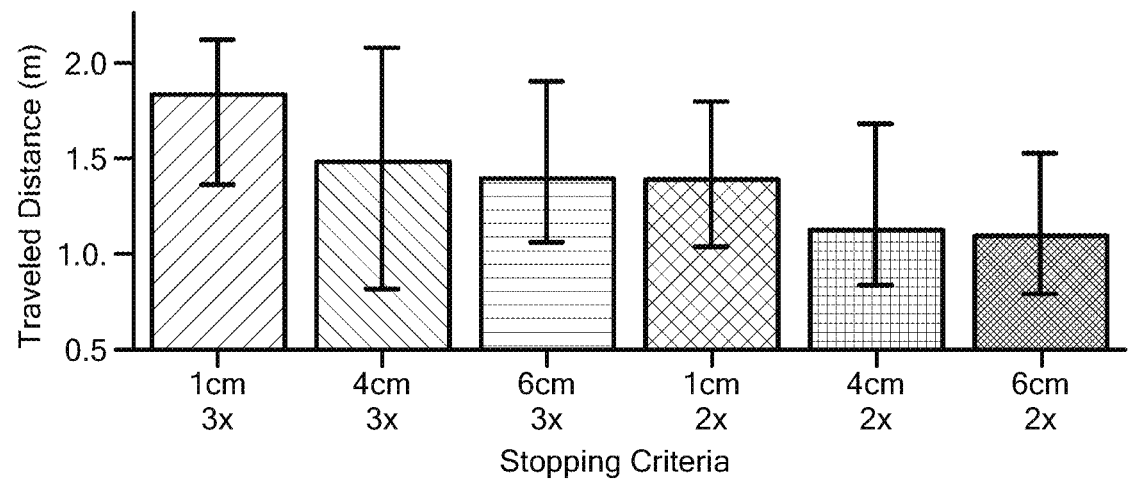
FIG. 9 is a bar chart of median traveled distance for different stopping criteria with error bars which denote the $10^{th}$ and $90^{th}$ percentile.

FIG. 9 shows the median traveled distance of the system for the different stopping criteria. The error bars indicate the $10^{th}$ and $90^{th}$ percentile. The following observations are noted:
- stopping criteria that requires three consecutive vantage points, rather than two, incurs an additional distance overhead of 20-75%. This is expected since more vantage points requires the gripper to move to a new pose, increasing the overall traveled distance.
- when the number of consecutive vantage points is fixed, stopping criteria that requires a smaller change in location estimate also requires a longer traveled distance. For example, a threshold of 1 cm requires 20% additional traveled distance over a threshold of 4 cm. This is also expected since a smaller change is a more stringent requirement.
- interestingly, it is observed that across all six stopping criteria, RFusion achieved a localization accuracy of around 1 cm, making them all equally desirable from a localization perspective.

Since the median localization accuracy across the different stopping criteria was similar, and the traveled distance was lower (i.e., more efficient) for more relaxed criteria, (4 cm, 2×) may be selected as a stopping criterion for RFusion's final implementation. This stopping criterion was then used for all the subsequent performance evaluation described below. It is noted that (4 cm, 2×) was selected rather than (6 cm, 2×) because the $90^{th}$ percentile localization accuracy is better.

Retrieval Efficiency vs Localization Error

The goal of another micro-benchmark experiment was to assess the impact of localization error on the efficiency of item retrieval. Higher retrieval efficiency indicates that RFusion succeeds in grasping the target item using a smaller number of grasping attempts. Mathematically, retrieval efficiency is defined as 1 divided by the number of grasping attempts (i.e. 1/# of grasping attempts).

Note that the denominator only includes attempts where the robot successfully picks up any item in the workspace (i.e., attempts where the robot fails to grasp any item are discarded). In this way, failures that are attributed to the pre-trained grasping network (rather than the above-described system implementation) are discarded.

120 trials were conducted in total. Across all trials, the environment was cluttered with many distractor objects but the target item was un-occluded from the camera (i.e., in its line-of-sight). This allowed us to assess the impact of localization error rather than pile complexity on the retrieval efficiency. Moreover, to avoid randomness in localization arising from RL-network and to focus on retrieval efficiency, the network was not used to perform RFID localization in this micro-benchmark experiment. Instead, the tag's ground truth location was obtained from the OptiTrack system, then artificially added different amounts of errors (1, 2, 4, or 8 cm) to the RFID's location before feeding the erroneous location into RFusion's grasping network. This allowed control of the errors and allowed understanding of their impact on retrieval efficiency. In each trial, RFusion's grasping network performed grasping given the erroneous location, and measured the retrieval efficiency as described above.

Figure 10:
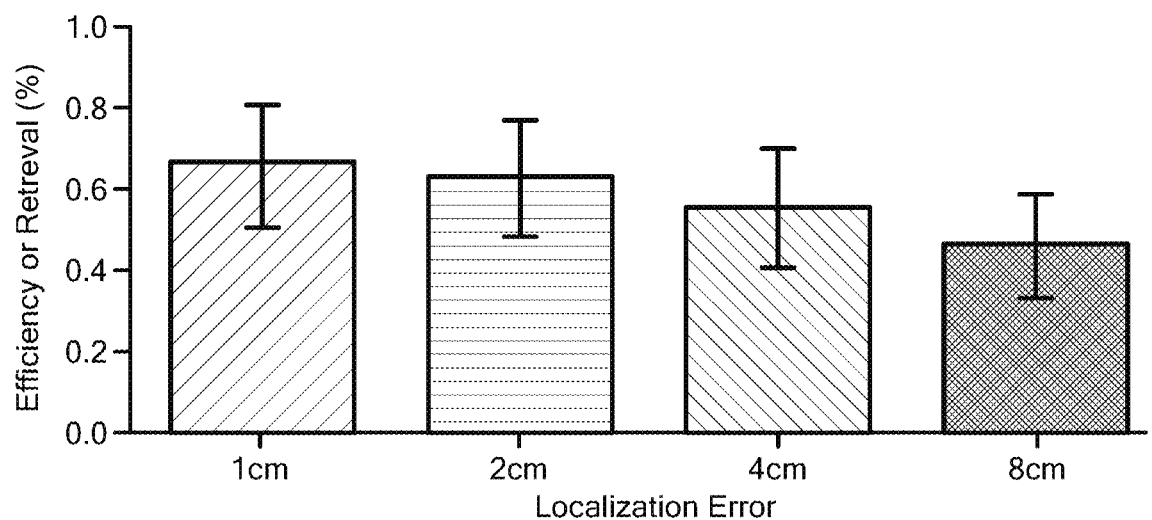
FIG. 10 is a bar chart of mean efficiency of target object retrieval vs RFID localization error with error bars which denote a 95% confidence interval.

FIG. 10 plots the mean retrieval efficiency with different levels of localization error, as well as the 95% confidence intervals. As expected, a smaller localization error results in the highest efficiency of retrieval, and the grasping efficiency drops off as the accuracy of the estimated location decreases. The 1 cm error has the highest mean efficiency at 67%. The mean efficiencies for 2, 4, and 8 cm are 63%, 56%, and 46% respectively. Interestingly, this result shows that even with 8 cm localization error, RFusion would only need two attempts (on average) before it successfully picks up the target item. At the same time, a higher localization accuracy of 1-2 cm would further boost its efficiency.

Performance Results

To evaluate RFusion's overall performance, experiments were conducted across all five scenarios described above. The experiments evaluated the localization accuracy, travel distance, efficiency of retrieval, robustness to orientation, and success rate.

Localization Accuracy

The accuracy of an RFusion system provided in accordance with the concepts described herein was evaluated in localizing RFID-tagged items. 105 trials were conducted. In each trial, the RFID-tagged target item was placed in a randomly chosen position in the workspace. The robot started from a randomly chosen initial pose, and performed geometric fusion, RF-visual control, and grasping as described above. The localization error was computed as the euclidean distance between the RFusion-estimated location and the ground-truth location obtained from the OptiTrack system.

Figure 11:
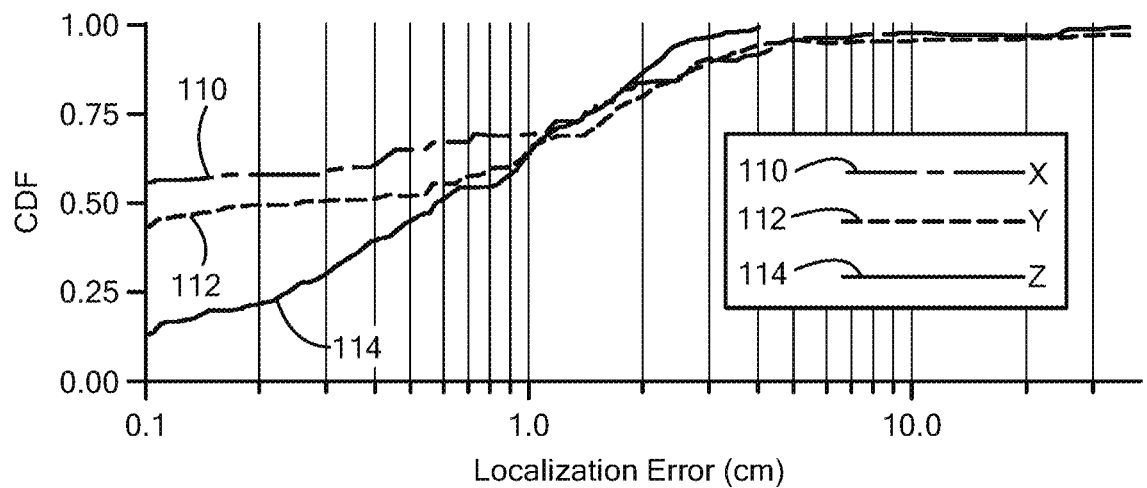
FIG. 11 is a plot of a cumulative distribution function (CDF) of localization accuracy along the X, Y, and Z dimensions.

FIG. 11 shows the CDF of the localization error along the x, y, and z dimensions across all the scenarios and trials (reference lines 110, 112, 114, respectively). The figure shows that RFusion's median errors along x, y, and z dimensions are 0.1 cm, 0.26 cm, and 0.6 cm respectively. The figure also shows that RFusion achieves $90^{th}$ percentile errors of 3.07 cm, 2.85 cm, and 2.16 cm along the x, y, and z dimensions respectively. These results demonstrate that RFusion can achieve centimeter level positioning accuracy, matching or exceeding that of state-of-the-art systems. However, unlike these prior systems that require an infrastructure to localize, RFusion can perform accurate localization in an infrastructure-less manner, by relying entirely on the wrist-mounted antenna.

Traveled Distance

As described above the RFusion's controller optimizes the robot's traveled distance for localization and grasping. A second experiment evaluated the distance traveled by RFusion's gripper and compared it to a baseline and to partial implementations of RFusion.

140 trials were conducted. In each trial, an RFID-tagged target item was placed in a randomly chosen location within the robot's workspace. The distance traveled by the gripper from its initial position until the first grasping point was computed.

Baseline Comparison

Since antenna arrays are standard in RFID localization, a baseline that uses RFusion's wrist-mounted antenna to obtain measurements from a 2D array of vantage points. The baseline moves the gripper to 9 predefined vantage points spanning the maximum aperture reachable given the robot's control constraints (the aperture is 40 cm in the y dimension and 55 cm in the x-dimension). To avoid errors caused by polarization, in the baseline the orientation of the tags were fixed to align with the wrist-mounted antenna since the RFusion system described herein includes a mechanism to address orientation errors. Once the system has obtained measurements from all 9 vantage points, it uses them to localize the RFID using a method which may be the same as or similar to the method described above, and then moves its gripper to the estimated grasping point. The baseline is evaluated in the same scenarios as RFusion, with each experimental trial mirroring the same initial conditions as an RFusion trial. The localization error is computed and the traveled distance for both RFusion and the baseline as described earlier.

Figure 12:
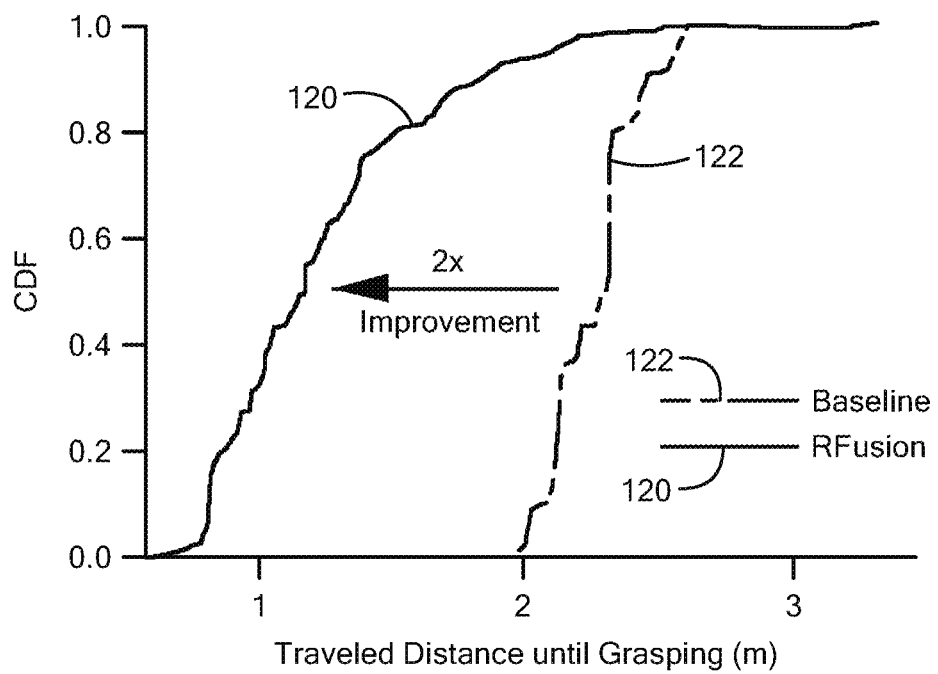
FIG. 12 is a plot of CDF vs. traveled distance for both an RFusion system and a baseline system.

FIG. 12 shows the CDF of the traveled distance of a system of operating in accordance with the concepts described—herein—e.g., RFusion (line 120) and the baseline (line 122). From observation of FIG. 12, the following may be noted. The median traveled distance for RFusion and the baseline are 1.18 m and 2.31 m respectively. This shows that RFusion improves the traveled distance by a median of 2 times (2×) over the baseline. The $90^{th}$ percentile traveled distance of RFusion and the baseline is 1.8 m and 2.45 m respectively. This shows that RFusion not only improves the median but also the $90^{th}$ percentile by 36%. Also computed was the localization error for both RFusion and the baseline. Interestingly, the baseline achieves slightly better localization error (1.02 cm) than RFusion (1.18 cm), likely due to the baseline's larger aperture. This is expected according to the micro-benchmark experiment described above, which demonstrated that more vantage points slightly improve localization performance.

These results show that RFusion can optimize its trajectory to localize and grasp the item of interest and that this improvement in efficiency does not come at the expense of meaningful change in localization accuracy.

Decomposing RFusion's Gains

Next, the gains from each of RFusion's key primitives (geometric fusion and RL-based control) are quantified. To do this, two partial implementations of RFusion were built and evaluated.

In a first partial implementation (RFusion (RL, No Vision)), the robot does not use any visual information for localization. Since RF-DOP requires at least three measurements, this implementation randomly chooses three initial vantage points for each experimental trial. After the third vantage point, it uses the same RL-based controller as RFusion to determine its subsequent vantage points (but relying only on RF features). This implementation's stopping criteria is the same as RFusion.

In a second partial implementation (RFusion (No RL, Vision), the robot starts from a random initial pose and performs geometric fusion similar to RFusion's full implementation. Then, instead of performing RL to identify its subsequent vantage points, the robot intelligently selects four vantage points based on the candidate regions identified in geometric fusion. Specifically, first it computes the mean of the candidate regions. Then, it identifies four vantage points at the corners of a 0.6 m square centered on the mean. This implementation stops when it obtains its fifth measurement (to allow for outlier rejection described above). In this partial implementation, localization is constrained using RF-Visual Geometric Fusion similar to RFusion.

Figure 13A:
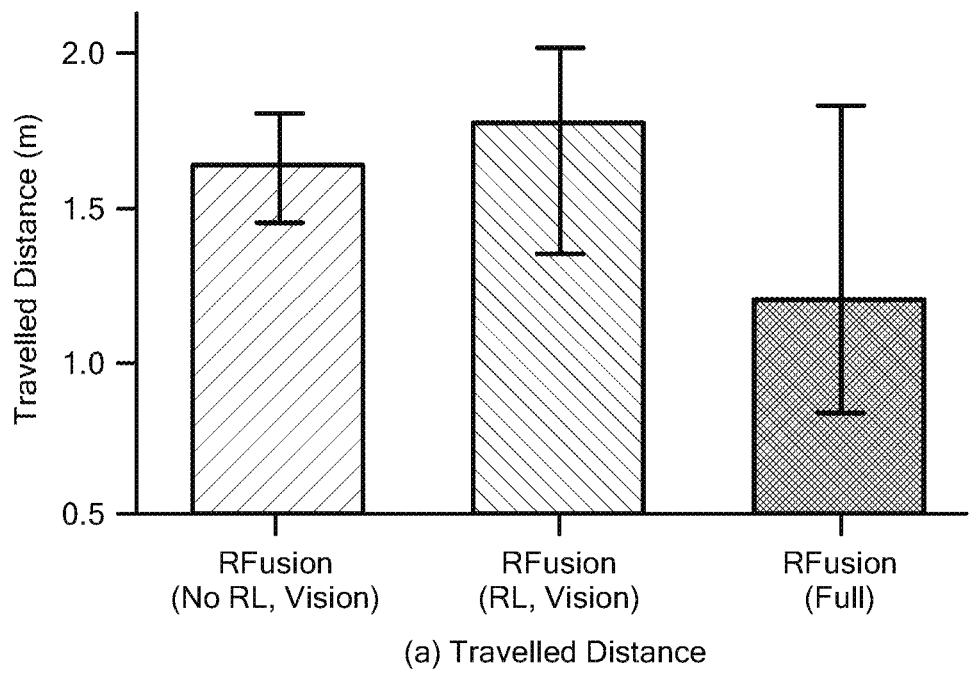
FIG. 13A is a bar chart of median distance traveled distance (with error bars denoting $10^{th}$ and $90^{th}$ percentiles) for three different implementations of RFusion systems.

FIG. 13A plots the median traveled distances for RFusion and the partial implementations. Error bars indicate $10^{th}$ and $90^{th}$ percentiles. The following is noted. The partial implementations RFusion (No RL, Vision) and RFusion (RL, No Vision) have a median travel distance of 1.63 m and 1.76 m respectively. Interestingly, both partial implementations outperform the baseline of FIG. 12, which has a median of 2.31 m. This demonstrates the value of each sub-component individually. RFusion travels a median distance of 1.18 m from initial position to the grasping point, outperforming both the partial implementations and the baseline. This demonstrates the value of combining both sub-components in RFusion's overall design. RFusion and both its partial implementations achieve a $90^{th}$ percentile travel distance of 1.8-2.01 m, again outperforming the baseline's (2.45 m).

Figure 13B:
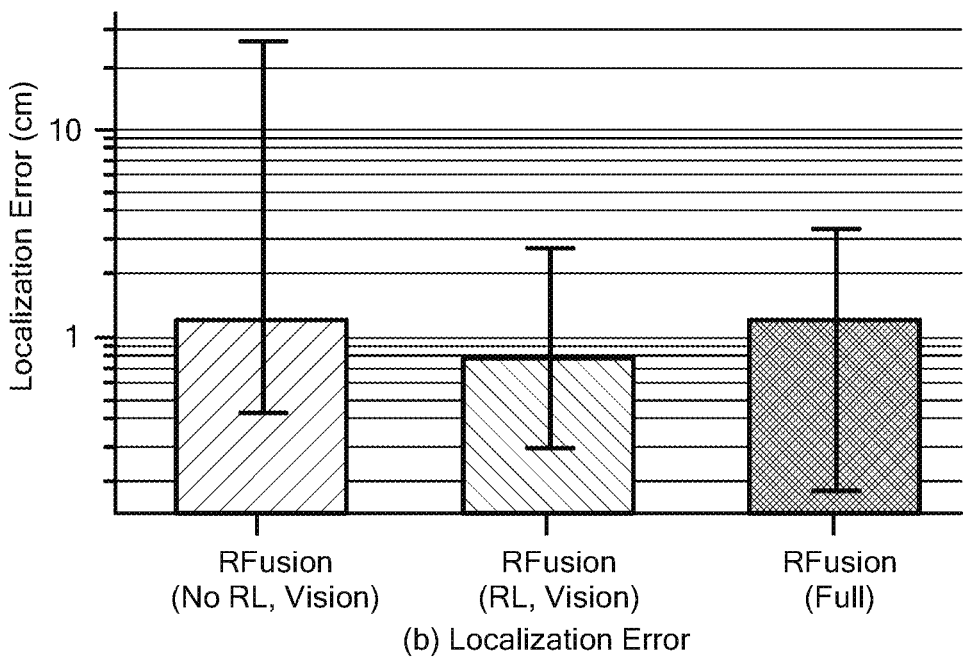
FIG. 13B is a bar chart of median localization error (with error bars denoting $10^{th}$ and $90^{th}$ percentiles) for three different implementations of RFusion systems.

FIG. 13B plots the median localization error for RFusion and the partial implementations. Error bars indicate $10^{th}$ and $90^{th}$ percentiles. The following is noted: RFusion and the partial implementations all achieve similar median localization accuracies of 0.8-1 cm; RFusion and its partial implementation that uses RL both achieve a $90^{th}$ percentile localization accuracy of 2-3 cm. In contrast, RFusion (No RL, Vision) has a much worse $90^{th}$ percentile localization error of 26.22 cm. This is because this partial implementation has a predefined stopping criterion and a fixed number of vantage points, which prevent it from adapting to scenarios where the system is not confident in its RFID location estimate.

Overall, the above-described results demonstrate that RFusion benefits from both of its sub-components and can avoid large localization errors by travelling longer distances if needed. Moreover, the median traveled distance of RFusion is significantly less than the partial implementations, demonstrating the benefits of combining RL-based control and RF-Visual geometric fusion in one system. These results were demonstrated across a wide range of locations in the work space, scenario types, and tag orientations, which also demonstrates the performance in practical, unstructured environments.

Retrieval Efficiency

Next, RFusion's efficiency in retrieving a target item from its work space was evaluated. As noted above, the grasping network uses the target item's location as an attention mechanism. Moreover, because the antenna can estimate its distance to the RFID, it can determine when it has picked up the target item. Hence, RFusion makes successive grasping attempts until it determines that the target object has been picked up. In scenarios where it picks up an item other than its target, the item is moved to the side; this allows RFusion to deal with scenarios when the object is under a pile.

To evaluate retrieval efficiency, the same experimental trials described above were used and measured the number of picks required until RFusion grasps the object of interest. Unlike RF localization, which is minimally impacted by the complexity of the scenario, the number of picking attempts is dependent on complexity. For example, if the target object is under a pile, RFusion needs to first grasp and set aside the occluding item(s) on top of it before it can grasp the target. Hence, the number of picks are reported separately for each of the evaluated scenarios.

Figure 14:
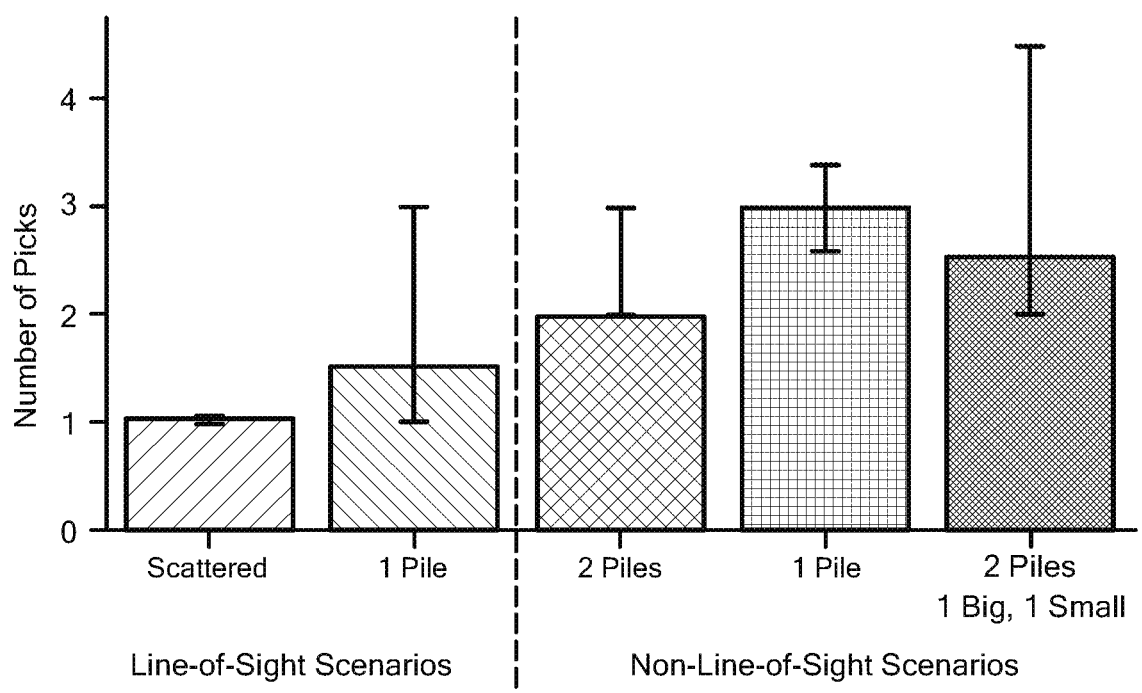
FIG. 14 is a bar chart of retrieval efficiency which illustrates a median number of picks required to grasp a target object in 5 different scenarios (with error bars denoting $10^{th}$ and $90^{th}$ percentiles).

FIG. 14 plots the median number of picks across the five different scenarios (and the error bars represent the $10^{th}$ and $90^{th}$ percentile number of picks). The scenarios may be sorted in increasing order of complexity on the x-axis, and the dashed vertical line separates the LOS and NLOS scenarios. Similar to the manner described above only the grasps where the robot successfully picks up any item were counted to factor out inefficiencies from the pre-trained grasping network. From FIG. 14, the following is noted.

In the simplest scenario, where the items are scattered and in line-of-sight, RFusion almost always requires only a single pick. This shows that combination of RFusion's high localization accuracy and attention-based grasping mechanism enable it to achieve high retrieval efficiency.

In the more cluttered LOS scenario (with 1 pile), RFusion requires a median of 1.5 picks to extract the target item. This is because even though the item is in line-of-sight, the pile is dense. Hence, in some scenarios, the robot may need to pick up a nearby item to declutter the target's vicinity prior to picking it up. Alternatively, even a small localization error might result in focusing the robot's attention to an adjacent item. Nonetheless, the grasping efficiency remains very high with a median overhead of 0.5 picks.

Across all NLOS scenarios, the median is always at or higher than 2 picks. This is expected because here the target item is occluded by at least one other item. Thus, in order to retrieve the target item, the robot first needs to grasp and remove the occluding item before it can retrieve its target. Impressively, in the scenario where there are two piles, RFusion successfully achieves the optimal picking strategy of only 2 picks.

Finally, the scenario with one large NLOS pile has the highest median picks for retrieval (3 picks). Indeed, the median extraction process for this scenario is more difficult than that of two piles. This is because all scenarios have similar number of items (1015), but when there is a single large pile, all items are stacked on top of each other. Thus, RFusion may need to grasp and remove multiple occluding items before it can retrieve its target item.

These results demonstrate that RFusion's efficiency of item retrieval is primarily dependent on the number of items covering the target item rather than on the complexity and number of piles in the workspace. This is because RF-Visual Geometric Fusion and RFID localization quickly eliminate distractor piles, thus allowing the system to efficiently retrieve the target item.

Here, it is also worth comparing RFusion to prior systems that rely only on vision for retrieving occluded objects. When dealing with piles of the same size and complexity as those tested here, state-of-the-art vision systems require a median of 6.5 picks [6], i.e., twice that of RFusion. This demonstrates that RFusion's ability to leverage RFID localization doubles the retrieval efficiency.

Robustness to Orientation

Recall that RFusion relies on a linearly-polarized antenna mounted on the robot's wrist and that it rotates and adjusts the gripper and antenna's rotation to achieve good SNR for estimating the RFID's channel. In this section, an example RFusion system's robustness to variations in the orientation of RFID-tagged objects are described.

To evaluate the robustness to orientation, 48 experimental trials were conducted, placing the RFID-tagged item in a different location and orientation in the workspace. The tag's orientation was varied from 0-180 degrees at 30-degree intervals. (Note that because the tag is linearly polarized, 0 and 180 degrees are the same; similarly 30 and 210 degrees.) Also implemented was a variant of the RFusion system that does not adjust its gripper orientation (i.e., the variant does not have the orientation module described above). This variant was evaluated in the exact same scenarios as RFusion's full implementation (i.e., with the same initial conditions for the robot pose, tag position, and tag orientation). The localization accuracy of both systems was computed across different orientations.

Table 1 shows the median localization error across tag orientations for both RFusion and its variant implementation.

TABLE 1

Localization Error (in cm) vs Tag Orientation.

| | Tag Orientation | | | | | |
|---|---|---|---|---|---|---|
| | 0° | 30° | 60° | 90° | 120° | 150° |
| RFusion | 1.09 | 1.35 | 1.62 | 1.41 | 2.72 | 2.6 |
| w/o Rotation | 1.81 | 0.41 | Failed | Failed | Failed | 1.1 |

The table shows that RFusion achieves centimeter-level accuracy regardless of the tag's orientation. In contrast, the implementation without antenna rotation fails to localize any tag at 60, 90, 120 degrees orientation. This is expected since when the tag and antenna polarization are close to orthogonal, the SNR of the channel estimate is low, resulting in poor localization accuracy. This results demonstrates the value of RFusion's ability to detect and recover from orientation mismatches and its ability to perform robust, orientation-agnostic RFID localization.

End-to-End Success Rate

Finally, RFusion's end-to-end success rate was evaluated. A trial is considered successful if RFusion can successfully retrieve the target item in any given experimental trial. To penalize highly inefficient scenarios, the retrieval task is aborted if the RFusion system fails to grasp any item within three consecutive attempts. 50 trials were run across the five scenarios explained above.

Table 2 shows RFusion's success rate across these scenarios, demonstrating an overall success rate of 96%.

TABLE 2

End-to-end Success Rate.

| LOS: | | NLOS: | | |
|---|---|---|---|---|
| Scattered | 1 pile | 1 pile | 2 piles | Big + small pile |
| 10/10 | 10/10 | /10 | /10 | 10/10 |

Although reference is made herein to particular systems and devices, it is appreciated that other materials having similar functional and/or structural properties may be substituted where appropriate, and that a person having ordinary skill in the art would understand how to select such materials and incorporate them into embodiments of the concepts, techniques, and structures set forth herein without deviating from the scope of those teachings.

Various embodiments of the concepts, systems, devices, structures and techniques sought to be protected are described herein with reference to the related drawings. Alternative embodiments can be devised without departing from the scope of the concepts, systems, devices, structures and techniques described herein. It is noted that various connections and positional relationships (e.g., over, below, adjacent, etc.) are set forth between elements in the following description and in the drawings. These connections and/or positional relationships, unless specified otherwise, can be direct or indirect, and the described concepts, systems, devices, structures and techniques are not intended to be limiting in this respect. Accordingly, a coupling of entities can refer to either a direct or an indirect coupling, and a positional relationship between entities can be a direct or indirect positional relationship.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance, or illustration." Any embodiment or design described herein as "exemplary" is not necessarily to be construed as preferred or advantageous over other embodiments or designs. The terms "one or more" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed is:

1. A robotic system comprising:
A robotic member having an end effector;
An imaging device coupled to the robotic member proximate to or on the end effector, the imaging device configured to provide visual information;
A radio frequency (RF) system configured to collect and provide information, the RF system including an antenna coupled to the robotic member proximate to or on the end effector; and
A controller in communication with the robotic member, the imaging device and the RF system, the controller configured to geometrically fuse RF distance information provided thereto by the RF system and visual information provided thereto by the imaging device to reduce uncertainty about a location of a target object even when the object is fully occluded,
Wherein the controller is further configured to:
Iteratively geometrically fuse the RF distance information and the visual information to reduce uncertainty about the target object location;
Determine whether the uncertainty is smaller than a threshold value; and
In response to the uncertainty being smaller than the threshold value, cause the end effector to manipulate the target object.

2. The robotic system of claim 1 wherein the end effector comprises a gripper and wherein the imaging device is coupled to a portion of the gripper.

3. The robotic system of claim 1 wherein the end effector comprises a gripper and wherein the antenna is coupled to a portion of the gripper.

4. The robotic system of claim 1, wherein the controller is further configured to cause movement of the end effector to a position that reduces uncertainty about the target object location.

5. The robotic system of claim 1, wherein the controller is further configured to identify an occluding object.

6. The robotic system of claim 5, wherein the controller is further configured to cause the end effector to manipulate the occluding object.

7. The robotic system of claim 1, wherein the controller is further configured to:
cause the end effector to grasp the target object;
receive an RF signal from the target object; and
verify, using the received RF signal, that the end effector has picked up the target object.

8. The robotic system of claim 1, wherein the controller is further configured to process the fused RF distance and visual information using a reinforcement-learning network to localize, maneuver toward, and grasp the target object.

9. A reinforcement-learning network comprising:
means for receiving fused RF distance and visual information;
means for processing the fused RF distance and visual information to efficiently localize, maneuver toward, and grasp a target object; and
a reinforcement-learning agent configured to be rewarded based on a distance traveled to a location of the target object and a number of vantage points required until successful localization of the target object.

10. The reinforcement-learning network of claim 9, further comprising an RF-visual encoder configured to encode RF distance information and visual information to be provided as a feature input to the reinforcement-learning network.

11. An apparatus for locating a target object, the apparatus comprising:
   An imaging device configured to collect visual data and provide visual information, the imaging device including a camera coupled to the apparatus;
   A radio frequency (RF) system configured to collect and provide RF information, the RF system including an antenna coupled to the apparatus; and
   A processing module in communication with the imaging device and the RF system, the processing module configured to:
      Estimate a range to the target object using the RF information, the range including one or more distance estimates between a location of the antenna and a location of the target object;
      Generate an occupancy map of an environment of the imaging device using the visual information;
      Geometrically fuse the range obtained from the RF information with the occupancy map from the visual information; and
      Use the fused information to identify one or more candidate regions for a location of the target object,
      Wherein the imaging device and the RF system are mounted on a robotic end effector, and wherein the processing module is further configured to:
         Iteratively geometrically fuse the range obtained from the RF information and the visual information to reduce the uncertainty about the target object location;
         Determine whether the uncertainty is smaller than a threshold value; and
         In response to the uncertainty being smaller than the threshold value, cause the end effector to manipulate the target object.

12. The apparatus of claim 11, wherein the imaging device and the RF system are mounted on a robot.

13. The apparatus of claim 11, wherein the processing module is further configured to process the fused RF distance and visual information using a reinforcement-learning network to localize, maneuver toward, and grasp the target object.

14. The apparatus of claim 13, wherein the reinforcement-learning network includes a reinforcement-learning agent configured to be rewarded based on a distance traveled to a location of the target object and a number of vantage points required until successful localization of the target object.

15. The apparatus of claim 11, wherein the occupancy map includes a 3D point cloud.

16. The apparatus of claim 11, wherein the processing module is further configured to:
   cause the end effector to grasp the target object;
   receive an RF signal from the target object; and
   verify, using the received RF signal, that the end effector has picked up the target object.

* * * * *